(12) United States Patent
Omori et al.

(10) Patent No.: US 7,695,222 B2
(45) Date of Patent: Apr. 13, 2010

(54) INDEXABLE INSERT

(75) Inventors: Naoya Omori, Itami (JP); Yoshio Okada, Itami (JP); Minoru Itoh, Itami (JP); Susumu Okuno, Itami (JP); Shinya Imamura, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 444 days.

(21) Appl. No.: 11/813,829

(22) PCT Filed: Oct. 13, 2006

(86) PCT No.: PCT/JP2006/320459

§ 371 (c)(1),
(2), (4) Date: Jul. 12, 2007

(87) PCT Pub. No.: WO2007/046299

PCT Pub. Date: Apr. 26, 2007

(65) Prior Publication Data

US 2009/0003944 A1    Jan. 1, 2009

(30) Foreign Application Priority Data

Oct. 21, 2005    (JP) ............................. 2005-307109

(51) Int. Cl.
*B23B 27/14* (2006.01)
*B23B 51/00* (2006.01)

(52) U.S. Cl. ...................................... 407/119; 407/113

(58) Field of Classification Search ................. 407/119, 407/113–116; 428/336, 216; 51/309, 307
See application file for complete search history.

(56) References Cited

U.S. PATENT DOCUMENTS 5,861,210 A    1/1999    Lenander et al.
2002/0187370 A1    12/2002    Yamagata et al.

FOREIGN PATENT DOCUMENTS

| JP | 56-42412 B2 | 10/1981 |
|---|---|---|
| JP | 2001-347403 | 12/2001 |
| JP | 2002-144108 | 5/2002 |
| JP | 2004-122263 | 4/2004 |
| JP | 2004-122264 | 4/2004 |
| JP | 2004-216488 | 8/2004 |
| WO | WO 02/04156 A1 | 1/2002 |
| WO | PCT/JP2006/320459 | 11/2006 |

*Primary Examiner*—Will Fridie, Jr.
(74) *Attorney, Agent, or Firm*—Ditthavong, Mori & Steiner, P.C.

(57) ABSTRACT

An indexable insert (1) of the present invention includes a substrate (8) and a coating layer which includes inner layer and an outer layer. The inner layer includes an alumina layer or an alumna-containing layer serving as an outermost layer in contact with the outer layer, and the outer layer is composed of at least one metal selected from the group consisting of the periodic table group IVa elements, Va elements, and VIa elements, Al, and Si or a compound of at least one of the metals and at least one element selected from the group consisting of carbon, nitrogen, oxygen, and boron. In addition, the outer layer, in a portion involved in cutting, satisfies B/A≦0.9 wherein A μm is the average thickness on the flank face (3) side, and B μm is the average thickness on the rake face (2) side.

9 Claims, 8 Drawing Sheets

INDEXABLE INSERT

TECHNICAL FIELD

The present invention relates to an indexable insert (also referred to as a "throw-away tip").

BACKGROUND ART

Indexable inserts to be detachably mounted on tools for cutting workpieces have been known. As such indexable inserts, many cutting tips each including a substrate composed of a cemented carbide or cermet and a hard coating of ceramic formed thereon for improving wear resistance and toughness have been proposed.

In such indexable inserts, various attempts have been made to improve characteristics by changing the composition of a hard coating or differentiating the thickness of the hard coating on a flank face from that on a rake face (Japanese Unexamined Patent Application Publication No. 2001-347403 (Patent Document 1), Japanese Unexamined Patent Application Publication No. 2004-122263 (Patent Document 2), Japanese Unexamined Patent Application Publication No. 2004-122264 (Patent Document 3), and Japanese Unexamined Patent Application Publication No. 2004-216488 (Patent Document 4)).

In contrast, an attempt has recently been made to form an outermost layer of a color different from that of a lower layer in the hard coating so that the use state of an indexable insert is identified from the discoloration of the outermost layer (Japanese Unexamined Patent Application Publication No. 2002-144108 (Patent Document 5). However, this attempt has caused the problem of welding of the outermost layer used for identifying the use state and a workpiece during cutting, thereby degrading the surface state of the workpiece. However, substantially no attempt has been made to resolving the problem.

Japanese Unexamined Patent Application Publication No. 2001-347403 (Patent Document 1)

Japanese Unexamined Patent Application Publication No. 2004-122263 (Patent Document 2)

Japanese Unexamined Patent Application Publication No. 2004-122264 (Patent Document 3)

Japanese Unexamined Patent Application Publication No. 2004-216488 (Patent Document 4)

Japanese Unexamined Patent Application Publication No. 2002-144108 (Patent Document 5)

DISCLOSURE OF INVENTION

Problem to be Solved by the Invention

The present invention has been achieved in consideration of the above-mentioned present conditions, and the present invention provides an indexable insert capable of decreasing as much as possible welding between a coating layer formed on a substrate and a workpiece, thereby not degrading the surface state of the workpiece.

Means for Solving the Problem

In order to solve the problem, the inventor intensively studied the conditions of contact between an indexable insert and a workpiece during a cutting work. As a result, as shown in FIG. 1, it was found that since the peripheral portion of an edge line 4 of an indexable insert 1 contacts a workpiece 5 and a flank face 3 faces the workpiece 5 while a rake face 2 positions on the chip 6 side, it is most effective to reduce the welding phenomenon that a measure is made for a coating layer (particularly, the outermost layer thereof) in the peripheral portion of the edge line in contact with the workpiece. Further repeated studies on the basis of this finding resulted in the completion of the present invention.

Namely, the present invention relates to an indexable insert including a substrate and a coating layer formed on the substrate, wherein the substrate has at least one flank face and at least one rake face, the flank face and the rake face are connected to each other with the edge line provided therebetween, and the coating layer includes at least one inner layer and an outer layer formed on the inner layer. The inner layer includes an alumina layer or an alumna-containing layer serving as an outermost layer in contact with the outer layer. The outer layer is composed of at least one metal selected from the group consisting of the periodic table group IVa elements, group Va elements, and group VIa elements, Al, and Si or a compound of at least one of the metals and at least one element selected from the group consisting of carbon, nitrogen, oxygen, and boron. In addition, in a portion involved in cutting, the outer layer satisfies B/A≦0.9 wherein A μm is the average thickness on the flank side, and B μm is the average thickness on the rake side.

The present invention also relates to an indexable insert including a substrate and a coating layer formed on the substrate, wherein the substrate has at least two flank faces, at least one rake face, and at least one corner, each flank face and the rake face are connected to each other with an edge line provided therebetween, and the corner is the point of intersection of the two flank faces and the one rake face. The coating layer includes an inner layer including at least one layer and an outer layer formed on the inner layer. The inner layer includes an alumina layer or an alumna-containing layer serving as an outermost layer in contact with the outer layer. The outer layer is composed of at least one metal selected from the group consisting of the periodic table group IVa elements, group Va elements, and group VIa elements, Al, and Si or a compound of at least one of the metals and at least one element selected from the group consisting of carbon, nitrogen, oxygen, and boron. In addition, on a line passing through the corner involved in cutting, dividing the angle formed by the two flank faces constituting the corner into two equal parts on the rake face, and extending from the rake face to the intersectional line of the two flank faces, the outer layer satisfies B/A≦0.9 wherein A μm is the average thickness in a segment region of 0.5 mm to 1 mm from the corner to the flank side, and B μm is the average thickness in a segment region of 0.5 mm to 1 mm from the corner to the rake side.

The present invention further relates to an indexable insert including a substrate and a coating layer formed on the substrate, wherein the substrate has at least one flank face and at least one rake face, the flank face and the rake face are connected to each other with the edge line provided therebetween, and the coating layer includes at least one inner layer and an outer layer formed on the inner layer. The inner layer includes an alumina layer or an alumna-containing layer serving as an outermost layer in contact with the outer layer. The outer layer is composed of at least one metal selected from the group consisting of the periodic table group IVa elements, group Va elements, and group VIa elements, Al, and Si or a compound of at least one of the metals and at least one element selected from the group consisting of carbon, nitrogen, oxygen, and boron. In addition, the inner layer is exposed in a region extending with a distance of less than 0.4 mm from the edge line to the flank face side and a region extending with a distance of less than 2 mm from the edge line to the rake face side, the surface of the exposed portion of the inner layer being composed of an alumina layer or an alumina-containing layer. The outer layer satisfies B/A≦0.9 wherein A μm is the average thickness in a region extending with a width of 0.2 mm from a point at a distance of 0.4 mm from the exposed portion of the inner layer to the center of the flank face, and B μm is the average thickness in a region extending with a width of 0.2 mm from a point at a distance of 0.4 mm from the exposed portion of the inner layer to the center of the rake face.

The substrate may include any one of a cemented carbide, cermet, high-speed steel, ceramic, a cubic boron nitride sintered compact, a diamond sintered compact, and a silicon nitride sintered compact.

The indexable insert can be used for drilling, end milling, milling, turning, metal sawing, gear cutting, reaming, tapping, or crankshaft pin milling.

ADVANTAGE OF THE INVENTION

The indexable insert of the present invention has the above-described constitution and is thus successful in decreasing as much as possible welding between the coating layer formed on the substrate and the workpiece, and accordingly preventing deterioration in the surface state of the workpiece.

Figure 1:
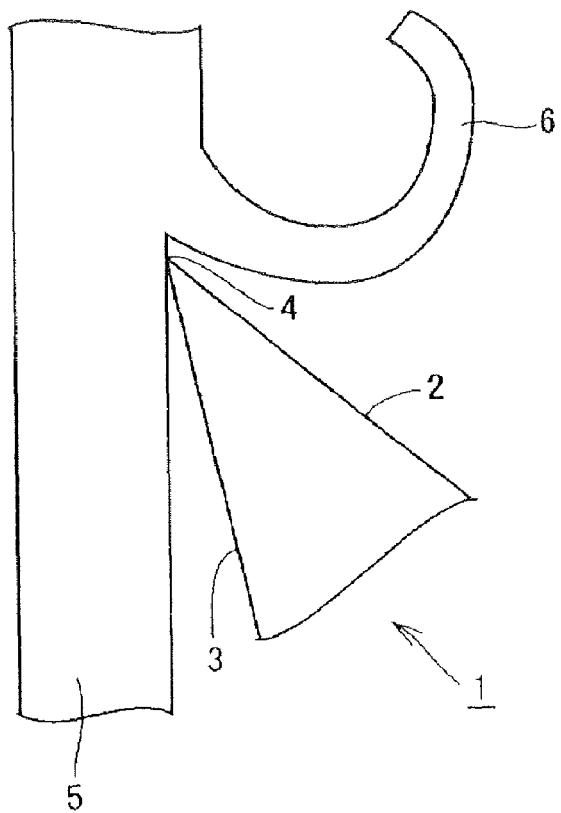
FIG. 1 is a schematic view schematically showing the state of contact between an indexable insert and a workpiece in cutting.

REFERENCE NUMERALS 1 indexable insert, 2 rake face, 3 flank face, 4 edge line, 5 workpiece, 6 chip, 7 through hole, 8 substrate, 9 corner, 11 coating layer, 12 inner layer, 13 outer layer.

BEST MODE FOR CARRYING OUT THE INVENTION

The present invention will be described in further detail below. Although an embodiment will be described with reference to the drawings, portions denoted by the same reference numeral in the drawings denote the same portion or corresponding portions. Each of the drawings is a schematic view for explanation, and the ratio of the thickness of a coating layer to the size of a substrate and the size ratio of the radius (R) of a corner are different from actual values.

<Indexable Insert>

An indexable insert according to the present invention includes a substrate and a coating layer formed on the substrate. The indexable insert of the present invention is particularly advantageous for drilling, end milling, milling, turning, metal sawing, gear cutting, reaming, tapping, and crankshaft pin milling.

The present invention is effective for both negative type and positive type indexable inserts and also effective for both indexable inserts provided with and without a chip breaker.

<Substrate>

As a constituent material of the substrate of the present invention, any substrate commonly known as a substrate of such an indexable insert can be used without particular limitation. Examples of such a material include cemented carbides (e.g., WC-based cemented carbides and cemented carbides containing WC and Co or further containing carbide, nitride, or carbonitride of Ti, Ta, or Nb), cermet (containing TiC, TiN, or TiCN as a main component), high-speed steel, ceramics (titanium carbide, silicon carbide, silicon nitride, aluminum nitride, aluminum oxide, and mixtures thereof), cubic boron nitride sintered compacts, diamond sintered compacts, and silicon nitride sintered compacts.

The substrate may be surface-modified. For example, a β-free layer may be formed on a surface of cemented carbide or a surface-hardened layer may be formed on cermet. Even when surface modification is performed, the advantage of the present invention can be exhibited.

As the shape of the substrate, any shape commonly known as a substrate shape of such an indexable insert can be used without particular limitation. Examples of a sectional shape taken in parallel with the substrate surface include a rhomboid, a square, a triangle, a circle, and an ellipse.

Figure 2:
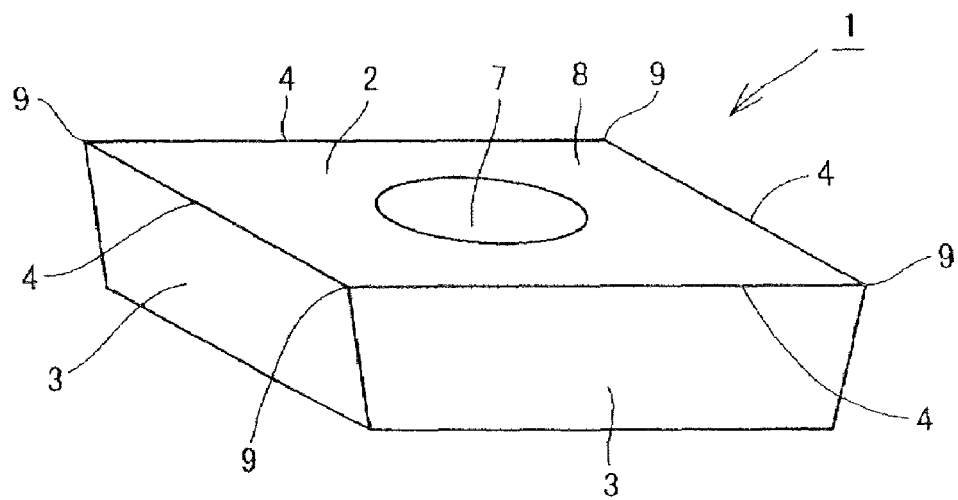
FIG. 2 is a schematic perspective view showing an example of an indexable insert of the present invention.

For example, as shown in FIG. 2, a substrate 8 has a structure including at least one flank face 3 and at least one rake face 2, the flank face 3 and the rake face 2 being connected to each other with an edge line 4 provided therebetween, and the edge line 4 serving as a central point of cutting action on a workpiece. The substrate 8 more preferably has a structure including at least two flank faces 3, at least one rake face 2, and at least one corner 9, the corner 9 being at the intersection between the two flank faces 3 and the rake face 2 and frequently serving as the most central point of cutting action.

The concept of the expressions "flank face", "rake face", "edge line", and "corner" includes not only portions on the surface of the substrate but also portions and faces in the outermost portion of the indexable insert 1 and corresponding surface portions and internal portions of each of layers such as an inner layer and an outer layer which will be described below.

Although the edge line 4 is shown as a straight line in FIG. 2, the edge line 4 is not limited to this. For example, the edge line 4 may be circumferential, ruffled, curved, or bent. The edge line and the corner can be subjected to edge processing such as chamfering and/or corner R-imparting processing. When the edge line does not form a clear line or the corner does not form a clear intersection due to edge processing, the rake face and the flank face which have undergone the edge processing are geometrically extended on the basis of the state before the edge processing to determine an edge or point of intersection between both faces as a hypothetic edge or point of intersection so that the hypothetically determined edge is regarded as an edge line or the hypothetically determined point of intersection is regarded as a corner. The expression "the rake face and the flank face are connected to each other with the edge line provided therebetween" and the expression "having the edge line" include the case in which the edge line is subjected to the above-described edge processing. The expression "the point of intersection of two flank faces and one rake face" and the expression "the point of intersection is a corner" include the case in which the corner is subjected to the above-described edge processing.

Although the rake face 2 is shown as a flat surface in FIG. 2, the rake face may have another structure, for example, a structure having a chip breaker or the like, according to demand. This applies to the flank face 3. Although the flank face 3 is shown as a flat surface in FIG. 2, the flank face 3 may be chamfered (divided into a plurality of surface regions), formed into a shape different from a flat surface or a curved surface using another method, or provided with a chip breaker.

The substrate of the present invention may have a through hole 7 formed to extend from the top to the bottom and used as a fixing hole for mounting the indexable insert 1 on a tool. In addition to or instead of the fixing hole, other fixing means may be provided according to demand.

<Coating Layer>

A coating layer 11 of the present invention is formed on the substrate 8, for example, as shown in FIGS. 3 to 10, and includes at least one inner layer 12 (shown as one layer in the drawings for the convenience sake) and an outer layer 13 formed on the inner layer 12. The inner layer 12 and the outer layer 13 will be separately described below.

Figure 3:
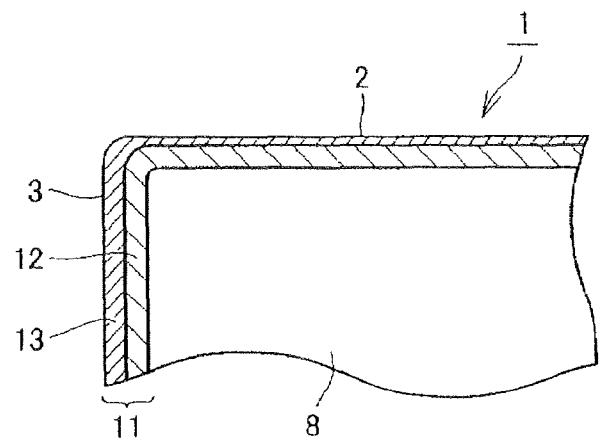
FIG. 3 is a schematic sectional view of a negative-type indexable insert without a chip breaker.
Figure 4:
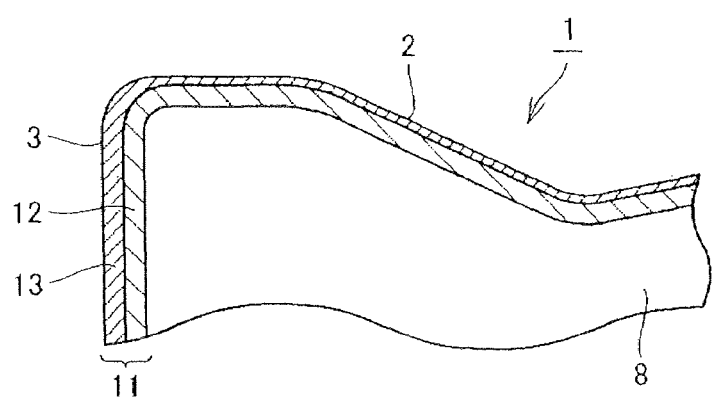
FIG. 4 is a schematic sectional view of a negative-type indexable insert having a chip breaker.
Figure 5:
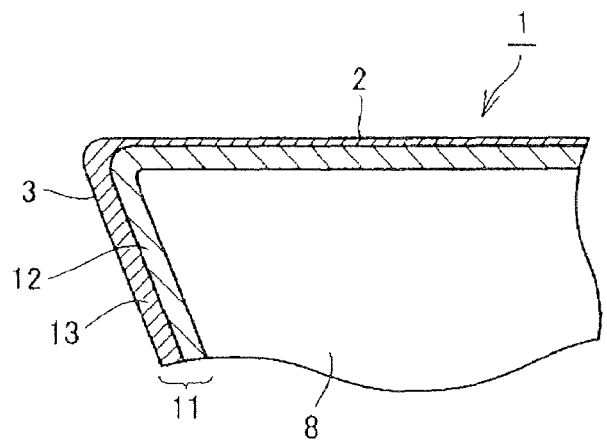
FIG. 5 is a schematic sectional view of a positive-type indexable insert without a chip breaker.
Figure 6:
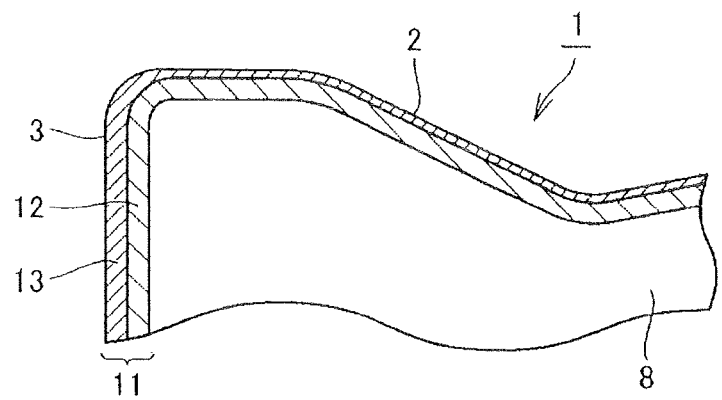
FIG. 6 is a schematic sectional view of a positive-type indexable insert having a chip breaker.
Figure 7:
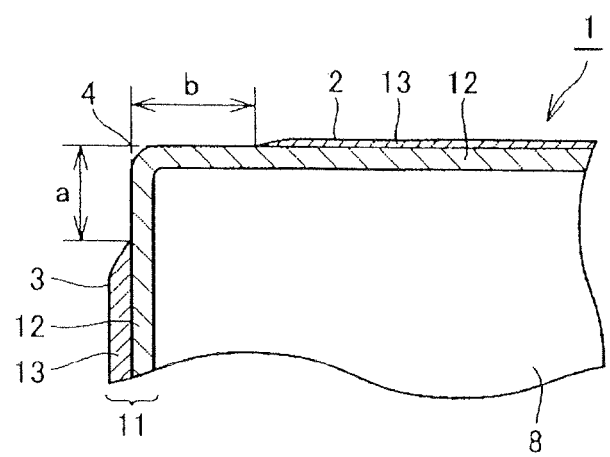
FIG. 7 is a schematic sectional view of a negative-type indexable insert without a chip breaker, in which an inner layer is exposed near an edge line.
Figure 8:
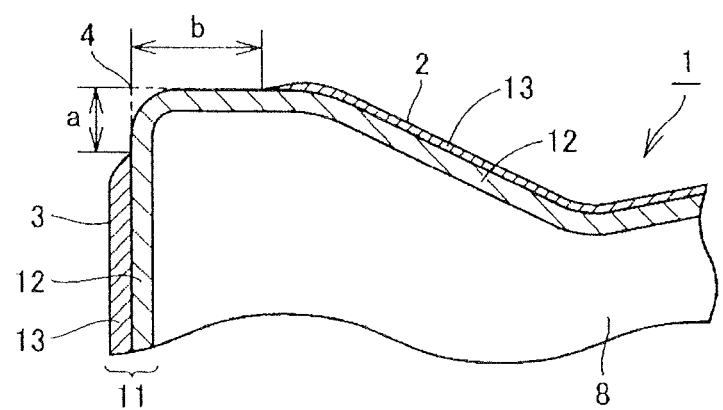
FIG. 8 is a schematic sectional view of a negative-type indexable insert having a chip breaker, in which an inner layer is exposed near an edge line.
Figure 9:
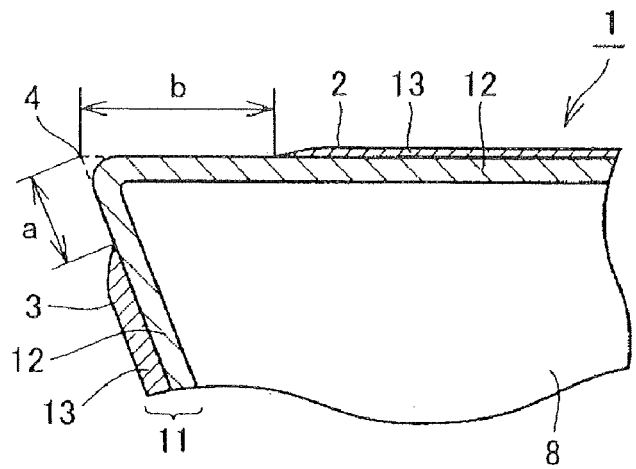
FIG. 9 is a schematic sectional view of a positive-type indexable insert without a chip breaker, in which an inner layer is exposed near an edge line.
Figure 10:
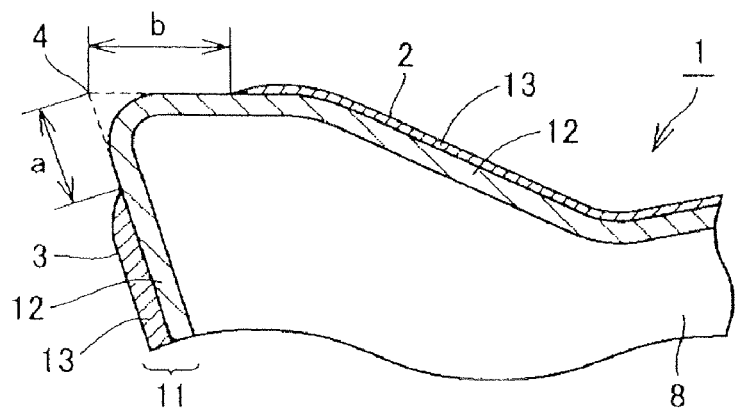
FIG. 10 is a schematic sectional view of a positive-type indexable insert having a chip breaker, in which an inner layer is exposed near an edge line.

FIGS. 3 and 4 are schematic sectional views schematically showing sections of negative-type (the rake face 2 and the flank face 3 cross at an angle of 90° or more) indexable inserts 1 provided without and with a chip breaker, respectively. FIGS. 5 and 6 are schematic sectional views schematically showing sections of positive-type (the rake face 2 and the flank face 3 cross at an acute angle) indexable inserts 1 provided without and with a chip breaker, respectively. FIGS. 7 to 10 correspond to FIGS. 3 to 6, respectively, and are schematic sectional views each schematically showing the state in which the inner layer 12 is exposed on the surface near the edge line as described below.

<Inner Layer>

The inner layer of the present invention is formed as at least one layer between the substrate and the outer layer which will be described below, and has the function to improve the properties of the indexable insert, such as wear resistance and toughness. The inner layer preferably has a color different from that of the outer layer which will be described below and is preferably formed to cover the entire surface of the substrate.

The inner layer includes an alumina layer or an alumina-containing layer as an uppermost layer in contact with the outer layer described below. The alumina layer or alumina-containing layer formed as the uppermost layer can decrease film damage due to micro chipping, thereby improving the wear resistance of the whole coating layer. In addition, the function to significantly decrease welding to the workpiece is exhibited by synergism with the definition of the thickness of the outer layer as described below. The detailed mechanism as to why welding to the workpiece can be decreased by forming the alumina layer or alumina-containing layer as the outermost layer of the inner layer in contact with the outer layer has not been known yet. However, it is thought that the outer layer having the specified thickness is worn down with any timing in a cutting process, and then the alumina comes into contact with the workpiece. In this case, chemical reaction little occurs between the alumina and the constituent components of the workpiece, and frictional resistance between the alumina and the workpiece is decreased.

Furthermore, the alumina layer or alumina-containing layer not only has the above-described excellent function but also assumes a dark color (correctly, it does not assume a black color but is easily influenced by the color of an underlying layer, and, in this application, it may be expressed as a black color). Therefore, the alumina layer or alumina-containing layer also has the advantage that a significant contrast can be formed between the layer and the outer layer formed thereon as described below.

Herein, the crystal structure of alumina (aluminum oxide, $Al_2O_3$) is not particularly limited, and it may be $\alpha$-$Al_2O_3$, $\kappa$-$Al_2O_3$, $\gamma$-$Al_2O_3$, or amorphous $Al_2O_3$, or a mixture thereof. The expression "alumina-containing layer" represents that the layer contains at least alumina (when the layer contains 50% by mass or more of alumina, it is considered as containing alumina), the balance being composed of a compound which will be described below, $ZrO_2$, or $Y_2O_3$ (considered as containing alumina and Zr or Y). The layer may contain chlorine, carbon, boron, or nitrogen.

In the inner layer, at least one layer preferably has compressive stress, and, in a portion involved in cutting, the alumina layer or alumina-containing layer preferably has compressive stress. In this case, the toughness can be effectively improved. When the compressive stress of the rake face is higher than that of the flank face, the toughness can be desirably further improved.

The portion involved in cutting represents a region (including segment regions c and d shown in FIG. 12 described below) extending with a width of 3 mm from the edge line which comes into contact with the workpiece (or come closest to the workpiece) to each of the flank side and the rake side. The definition of compressive stress includes the case in which the inner layer is exposed on the surface in this region. In this case, the alumina layer or the alumina-containing layer constituting the exposed surface has compressive stress.

The compressive stress is a type of internal stress (inherent distortion) present in a coating layer and is represented by a "−" (minus) value (unit used in the present invention: GPa). Therefore, the idea of high compressive residual stress corresponds to a large absolute value, and the idea of low compressive residual stress corresponds to a small absolute value. On the other hand, tensile stress is a type of internal stress (inherent distortion) present in a coating layer and is represented by a "+" (plus) value. The term "residual stress" means both the compressive stress and the tensile stress.

The compressive stress is preferably 0.1 GPa or more, more preferably 0.2 GPa or more, and most preferably 0.5 GPa or more in absolute value. When the absolute value is less than 0.1 GPa, sufficient toughness cannot be obtained in some cases. On the other hand, the absolute value is preferably as large as possible from the viewpoint of imparting toughness. However, when the absolute value exceeds 8 GPa, the coating layer undesirably peels in some cases.

The residual stress can be measured by a $\sin^2 \phi$ method using an X-ray stress measuring apparatus. The residual stress can be measured as follows: Stress is measured by the $\sin^2\phi$ method at any desired 10 points (preferably selected to be spaced 0.1 mm or more apart so that each of the points is representative of the stress of a region of the inner layer) which are included in the region of the inner layer to which the compressive residual stress is imparted, and the measurement values are averaged.

The $\sin^2\phi$ method using an X-ray is widely used as a method for measuring residual stress of polycrystalline materials. For example, the method described in "X-ray Stress Measurement Method" (The Society of Materials Science, Japan, issued by Yokendo Co., Ltd., 1981), pp. 54-67 may be used.

The residual stress may be measured by a method using Raman spectroscopy. The Raman spectroscopy has the advantage that it is capable of local measurement in a narrow region with a spot diameter of, for example, 1 µm. The Raman spectroscopic measurement of residual stress is generally known, but the method described in, for example, "Evaluation Technique for Thin Film Kinetic Properties" (Cipec (altered to Realize Advanced Technology Limited), 1992), pp. 264-271 may be used.

Further, the residual stress can also be measured using radiant light. This method has the advantage that a residual stress distribution can be determined in the thickness direction of the coating layer.

The inner layer can be formed by a known chemical vapor deposition method (CVD method) or physical vapor deposition method (PVD method including a sputtering method). The formation method is not limited. For example, when the indexable insert is used for drilling or end milling, the inner layer is preferably formed by the PVD method capable of forming the inner layer without decreasing transverse rupture strength. The thickness of the inner layer is preferably controlled by controlling the deposition time.

When the inner layer is formed by a known CVD method, the inner layer is preferably provided with a layer formed by a MT-CVD (medium temperature CVD) method. In particular, the inner layer is most preferably provided with a titanium carbonitride (TiCN) layer having excellent wear resistance which is formed by the MT-CVD method. A conventional CVD method is capable of forming a film at about 1020° C. to 1030° C., while the MT-CVD method is capable of forming a film at a relatively low temperature of about 850° C. to 950° C. and thus decreasing damage to the substrate due to heating in the deposition. Therefore, a layer formed by the MT-CVD method is preferably provided adjacent to the substrate. As the gas used in the deposition, nitrile gas, particularly acetonitrile ($CH_3CN$), is preferably used because of its excellent productivity. A laminated structure of a layer formed by the MT-CVD method and a layer formed by a HT-CVD (high temperature CVD, i.e., conventional CVD) method is preferred because the adhesive force between the coating layers may be increased.

The inner layer may include one or more laminated layers, and each layer can be composed of a compound of at least one metal selected from the group consisting of the group IVa elements (Ti, Zr, and Hf), the group Va elements (V, Nb, and Ta), and the group VIa elements (Cr, Mo, and W) in the periodic table, and Al and Si and at least one element selected from the group consisting of carbon, nitrogen, oxygen, and boron. Since the composition ratio (atomic ratio) of the compound constituting the inner layer may have the same definition as that of a compound constituting the outer layer described below, the ratio will be described in detail below.

For example, the inner layer may contain alumina ($Al_2O_3$) as such a compound and thus includes an alumina layer or alumina-containing layer as the uppermost layer in contact with at least the outer layer. An example of the laminated structure of the inner layer includes a TiN layer, a TiCN layer, and an $Al_2O_3$ layer as the uppermost layer which are formed on the substrate in that order. The three-layer type forms the inner layer as a whole and functions as a wear-resistant layer.

As shown in FIGS. 7 to 10, the inner layer can be exposed in a region a extending with a distance of less than 0.4 mm (preferably 30 µm or more) from the edge line 4 to the flank face 3 side and a region b extending with a distance of less than 2 mm (preferably 100 µm or more) from the edge line 4 to the rake face 2 side. In the exposed portion, the surface of the inner layer particularly preferably includes the alumina layer or the alumina-containing layer. This is because although welding to the workpiece possibly significantly occurs in the regions a and b, alumina chemically little reacts with the constituent components of the workpiece, and frictional resistance with the workpiece is decreased. The distances exceeding the above-described specified values are undesirable because the outer layer formed on the inner layer does not sufficiently indicate a color change as described below.

The distance on the flank face side is preferably less than 0.35 mm and more preferably less than 0.3 mm, and the distance on the rake face side is preferably less than 1.8 mm, more preferably less than 1.5 mm, and still more preferably less than 0.5 mm. The lower limits of the distances are 30 µm or more and 100 µm or more on the flank face 3 side and the rake face 2 side, respectively. The distances less than the lower limits are undesirable because the effect of exposure of the inner layer may not be sufficiently exhibited.

The method of exposing the inner layer in the surface is not particularly limited, and various commonly known methods can be used. For example, after the outer layer is formed on the inner layer, the outer layer in a predetermined portion where the inner layer to be exposed is removed by blasting, brushing, or barreling to expose the inner layer in the surface of the predetermined portion.

When the alumina layer or the alumina-containing layer which constitutes the inner layer, not the outer layer, is exposed as the uppermost surface layer in a central portion for cutting the workpiece near the edge line which is likely to come into contact with the workpiece, welding between the coating layer formed on the substrate and the workpiece can be effectively suppressed, and thus deterioration of the surface state of the workpiece can be effectively prevented. Further, film damage due to micro chipping can be decreased, and the wear resistance of the coating layer can be improved by synergism of these effects.

Examples of the compound constituting the inner layer, other than the alumina ($Al_2O_3$) (or in combination with Al$_2$O$_3$) include TiC, TiN, TiCN, TiCNO, TiB$_2$, TiBN, TiBNO, TiCBN, ZrC, ZrO$_2$, HfC, HfN, TiAlN, AlCrN, CrN, VN, TiSiN, TISiCN, AlTiCrN, TiAlCN, ZrCN, ZrCNO, AlN, AlCN, ZrN, and TiAlC.

A layer composed of TiBN or TiBNO is particularly preferably formed as an underlying layer of the alumina layer or the alumina-containing layer. By forming the layer composed of such a compound as the underlying layer, the adhesion to alumina can be greatly improved, and the color of the underlying layer can be recognized through the alumina layer in the portion where alumina is exposed on the surface. Therefore, in this portion, a color different from the color (black) of alumina can be provided.

The thickness of the inner layer (the total thickness when formed as a laminate of two or more layers) is preferably 0.05 μm to 30 μm. With a thickness of less than 0.05 μm, the function to improve characteristics such as wear resistance is not sufficiently exhibited, while with a thickness of over 30 μm, the characteristics are not much improved, thereby causing an economic disadvantage. However, the thickness may be 30 μm or more as long as economy is neglected, and the advantage of the invention is exhibited. As a method for measuring the thickness, for example, the indexable insert is sliced, and a section is measured by observation with SEM (scanning electron microscope) to measure the thickness.

When the inner layer is exposed on the surface, a portion near the boundary between the inner layer and the outer layer is observed through an electron microscope and/or a metal microscope. When the area of the exposed inner layer per unit area (100 μm×100 μm) is 80% or more, the inner layer is regarded as being exposed on the surface.

<Outer Layer>

The outer layer of the present invention is formed as at least one layer on the inner layer and is composed of at least one metal (including an alloy when the outer layer is composed of two or more metals) selected from the group consisting of the periodic table group IVa elements (Ti, Zr, and Hf), Va elements (V, Nb, and Ta), and VIa elements (Cr, Mo, and W), Al, and Si or a compound of at least one of the metals and at least one element selected from the group consisting of carbon, nitrogen, oxygen, and boron. In addition, in the portion involved in cutting, the outer layer satisfies B/A≦0.9 wherein A μm is the average thickness on the flank side, and B μm is the average thickness on the rake side.

In the portion involved in cutting, as described above, the thickness of the outer layer on the rake face side is controlled to be smaller than that on the flank face side. Therefore, there is exhibited the effect of effectively suppressing welding between the coating layer formed on the outer layer and the workpiece, and thus effectively preventing deterioration of the surface state of the workpiece. In other words, when the outer layer is formed so that in the portion involved in cutting, the thickness on the rake face side is smaller than a predetermined value as compared with the thickness on the flank face side, welding to the workpiece can be effectively decreased. This is based on the finding by inventor's research that welding to the workpiece significantly occurs on the rake face side and is based on the technical idea that the thickness of the outer layer is previously designed to be as small as possible in a portion likely to cause welding to the workpiece to accelerate wearing out of the outer layer so that the outer layer disappears before welding between the layer and the workpiece significantly occurs. As described above, the effect obtained by controlling the thickness of the outer layer is further improved by forming the alumina layer or the alumina-containing layer as the uppermost layer of the inner layer.

The portion involved in cutting depends on the shape of the indexable insert, the type and size of the workpiece, and the type of the cutting work, and represents a region extending with a width of 3 mm from the edge line which generally comes into contact with the workpiece (or come closest to the workpiece) to each of the flank face side and the rake face side. This region is under the condition that the inner layer is not exposed on the surface (when the inner layer is exposed on the surface, the definition of the thickness of the outer layer will be described below).

Each of the average thickness A μm on the flank face side and the average thickness B μm on the rake face side represents the average of the thicknesses measured at ten different measurement points within each of the regions. As the method for measuring the thickness, for example, the indexable insert is sliced, and a section is measured by observation with SEM (scanning electron microscope) to measure the thickness.

The B/A value is more preferably B/A≦0.7 and still more preferably B/A≦0.5. When the B/A value exceeds 0.9, welding to the workpiece cannot be effectively decreased. When the B/A value is 1 or less and exceeds 0.9, welding to the workpiece cannot be decreased. This is possibly due to the fact that the time required until the outer layer is worn out is increased. The lower limit of the B/A value is preferably 0.01 or more. This is because when the value is less than 0.01, the thickness of the outer layer on the rake face side is excessively decreased, and thus a color change described below cannot be sufficiently indicated.

The thickness of the outer layer is preferably controlled as described above by blasting, brushing, or barreling the outer layer after the outer layer is formed to a uniform thickness on the inner layer. As the method for controlling the thickness of the outer layer, another method, for example, a method of directly controlling the thickness in forming the outer layer can be used. However, it is difficult to directly form the thin outer layer so as to indicate a uniform color. Therefore, it is particularly effective to use the method of blasting, brushing, or barreling the outer layer after the outer layer is formed to a uniform thickness as described above. In blasting, a slurry is preferably sprayed on the rake face in a substantially vertical direction because the thickness of the outer layer on the rake face can be effectively decreased. However, a plurality of faces can be simultaneously processed by applying a slurry in a direction at a predetermined angle with the rake face.

In addition, the above-described processing can impart compressive stress to at least one layer of the coating layer, thereby causing the advantage of improving edge strength.

Figure 11:
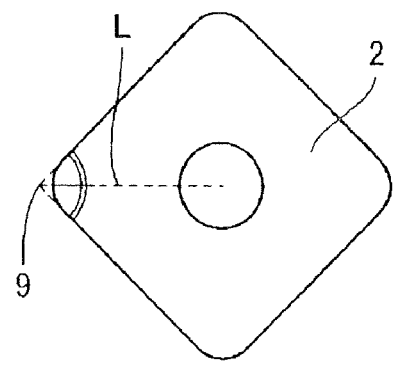
FIG. 11 is a plan view of an indexable insert, which shows line L dividing an angle formed by two flank faces into two equal parts.
Figure 12:
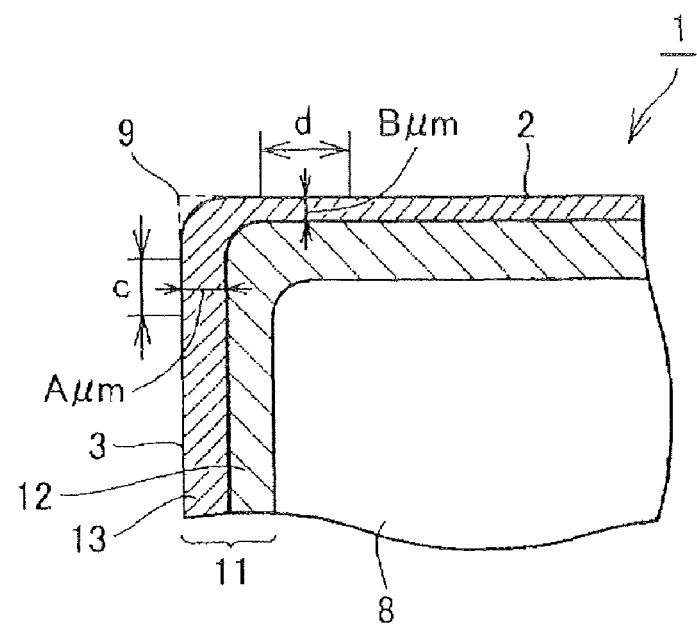
FIG. 12 is a schematic sectional view taken along the line L in FIG. 11.

In addition, on a line L passing through the corner 9 (hypothetical corner when the corner is subjected to edge processing as shown in the drawings) involved in cutting as shown in FIGS. 11 and 12, dividing the angle formed by the two flank faces constituting the corner into two equal parts on the rake face, and extending from the rake face to the intersectional line of the two flank faces 8 (the line L is shown only on the rake face 2 in FIG. 11, but the line L extends to the intersectional line of the two flank faces (a hypothetical line at an intermediate point of the radius when the corner is subjected to edge processing as shown in the drawing), the outer layer particularly preferably satisfies B/A≦0.9 wherein A μm is the average thickness in a segment region c of 0.5 mm to 1 mm from the corner 9 to the flank 3 side, and B μm is the average thickness in a segment region d of 0.5 mm to 1 mm from the corner 9 to the rake 2 side. This condition can more effectively decrease welding to the workpiece in cooperation with the use of the alumina layer or the alumina-containing layer as the uppermost layer of the inner layer.

The corner involved in cutting includes a corner actually coming into contact with (coming nearest to) the workpiece and a corner involved in cutting in which the edge line near the corner comes into contact with (coming nearest to) the workpiece (for example, when the temperature of the corner is increased). However, a corner simply coming into contact with a cutting chip of the workpiece due to flying during cutting is not included. Each of the segment regions c and d is under the condition that the inner layer is not exposed on the surface (when the inner layer is exposed on the surface, the condition of the thickness of the outer layer will be described below).

When the corner and the edge line are edge-processed, the intersectional line of the two flank faces represents a ling connecting a hypothetical corner and a hypothetical edge determined as a line passing through an intermediate point of the radius formed by the two flank faces (refer to FIGS. 11 and 12).

As described above, each of the segment regions c and d is specified in the range of 0.5 mm to 1 mm because the inventor's research revealed that welding between the outer layer and the workpiece within this specified range has the greatest influence on the surface state of the workpiece. The detailed mechanism has not yet been elucidated, but it is supposed that a cutting chip of the workpiece at a very high temperature, which is possibly cut near the corner, has the high probability of contact with a region within the specified range.

The B/A value is more preferably B/A≦0.7 and still more preferably B/A≦0.5. When the B/A value exceeds 0.9, welding to the workpiece cannot be effectively decreased. When the B/A value is 1 or less and exceeds 0.9, welding to the workpiece cannot be decreased. The reason for this is possibly the same as described above. The lower limit of the B/A value is preferably 0.01 or more. This is because when the value is less than 0.01, the thickness of the outer layer on the rake face side is excessively decreased, and thus a color change as described below cannot be sufficiently indicated.

Each of the average thicknesses A μm and B μm represents the average of the thicknesses measured at ten different measurement points within each of the segment regions c and d. As the method for measuring the thickness, the same measurement method as described above can be used. When the indexable insert has a plurality of corners, it is necessary to establish the relation of the B/A value for all corners which may be involved in cutting.

Figure 14:
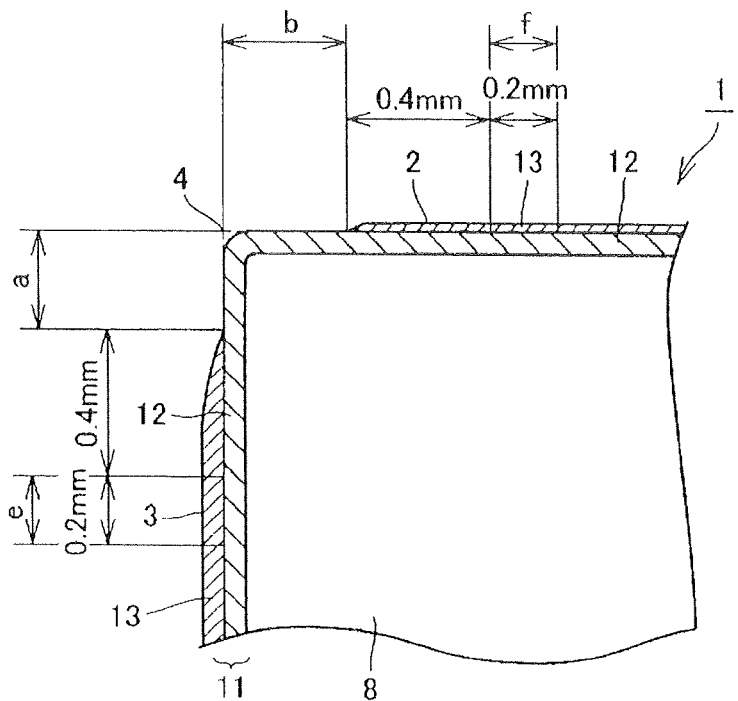
FIG. 14 is a schematic sectional view of an indexable insert, which shows a region for defining an average thickness when an inner layer is exposed near an edge line.

Furthermore, when the inner layer 12 is exposed on the surface near the edge line 4 as shown in FIG. 14 (i.e., when the inner layer 12 is exposed in the region a extending with a distance of less than 0.4 mm from the edge line 4 to the flank face 3 side and the region b extending with a distance of less than 2 mm from the edge line 4 to the rake face 2 side, and the surface of the exposed portion of the inner layer 12 is composed of the alumina layer or the alumina-containing layer), the outer layer satisfies B/A≦0.9 wherein A μm is the average thickness in a region e extending with a width of 0.2 mm from a point at a distance of 0.4 mm from the exposed portion of the inner layer 12 to the center of the flank face 3, and B μm is the average thickness in a region f extending with a width of 0.2 mm from a point at a distance of 0.4 mm from the exposed portion of the inner layer 12 to the center of the rake face 2. This condition can more effectively decrease welding to the workpiece when the inner layer is exposed on the surface near the edge line.

The point at a distance of 0.4 mm from the exposed portion of the inner layer 12 to the center of the flank face 3 represents the point at a distance of 0.4 mm from the boundary (determined by the above-described method) between the inner layer and the outer layer in a direction opposite to the edge line side (i.e., a direction away from the edge line). Similarly, the point at a distance of 0.4 mm from the exposed portion of the inner layer 12 to the center of the rake face 2 represents the point at a distance of 0.4 mm from the boundary between the inner layer and the outer layer in a direction opposite to the edge line side (i.e., a direction away from the edge line).

As described above, each of the regions e and f is defined as a region extending with a width of 0.2 mm from the point at a distance of 0.4 mm from the exposed portion of the inner layer. This is because the inventor's research revealed that when the inner layer is exposed on the surface near the edge line, welding between the outer layer within the specified range and the workpiece influences the surface state of the workpiece. The detailed mechanism has not yet been elucidated, but it is supposed that a cutting chip of the workpiece at a very high temperature, which is possibly cut by the exposed portion of the inner layer, has the high probability of contact with a region within the specified range.

The B/A value is more preferably B/A≦0.7 and still more preferably B/A≦0.5. When the B/A value exceeds 0.9, welding to the workpiece cannot be effectively decreased. When the B/A value is 1 or less and exceeds 0.9, welding to the workpiece cannot be decreased. The reason for this is possibly the same as described above. The lower limit of the B/A value is preferably 0.01 or more. This is because when the value is less than 0.01, the thickness of the outer layer on the rake face side is excessively decreased, and thus a color change described below cannot be sufficiently indicated.

Each of the average thicknesses A μm and B μm represents the average of the thicknesses measured at ten different measurement points within each of the regions e and f. As the method for measuring the thickness, the same measurement method as described above can be used.

The outer layer can be formed by a known chemical vapor deposition method or a physical vapor deposition method (including a sputtering method). The formation method is not particularly limited.

The outer layer of the present invention functions as an outermost layer of the indexable insert except when the inner layer is exposed on the surface as described above, and preferably assumes a color different from that of the inner layer (the outermost layer thereof) (i.e., basically different in composition from the inner layer (the outermost layer thereof). Therefore, the outer layer exhibits the function as a use-state indicating layer for identifying the use state of the indexable insert (particularly, the edge line). Namely, the outer layer is a layer more easily wearing than the inner layer so that when the edge line is used for cutting the workpiece, the outer layer formed in a portion adjacent to the edge line wears out to expose the surface of the inner layer or discolor the outer layer in the portion. Consequently, the used edge line can be identified by observing a color change.

Examples of the metal constituting the outer layer include Cr and Al. Examples of the compound constituting the outer layer include TiC, TiN, TiCN, TiCNO, $TiB_2$, TiBN, TiBNO, TiCBN, ZrC, $ZrO_2$, HfC, HfN, TiAlN, AlCrN, CrN, VN, TiSiN, TiSiCN, AlTiCrN, TiAlCN, ZrCN, ZrCNO, AlN, AlCN, ZrN, and TiAlC. However, $Al_2O_3$ is not contained as the outer layer. As described above, alumina ($Al_2O_3$) is formed as the uppermost layer of the inner layer or an alumina-containing layer, and is unsuitable for use as a use-state indicating layer because alumina assumes a black color.

In the compound constituting the outer layer, the component ratio (atomic ratio) of at least one of the metals to at least one element selected from the group consisting of carbon, nitrogen, oxygen, and boron is not necessarily limited to 1:1 as generally known. The ratio of the element to the metal may be about 0.5 to 1 (for example, in the case of $Ti_aN_b$, when a+b=100 atomic %, b is about 35 to 50 atomic %). When a plurality of elements is used as the element, the atomic ratio of the elements is not necessarily limited to equal ratio, any known atomic ratio can be selected. Therefore, in the examples below, when the compound is described, any known atomic ratio can be selected as the atomic ratio of the constituent elements of the compound unless otherwise specified.

When the outer layer is composed of a plurality of metals (including an alloy), any known atomic ratio can be selected as the atomic ratio of the metals.

The outer layer does not have the strong function to improve wear resistance (i.e., preferably an easily wearing layer with lower wear resistance than that of the inner layer) and has a relatively small thickness. The thickness (the total thickness when the outer layer includes two or more layers) is preferably 0.05 μm to 2 μm and more preferably 0.1 μm to 0.5 μm. With a thickness of less than 0.05 μm, uniform coating on a predetermined portion is industrially difficult, thereby causing color variation in the appearance and impairing the appearance. With a thickness of over 2 μm, the function as the use-state indicating layer is not much increased, and thus such a thickness is economically disadvantageous. The thickness can be measured by the same method as described above.

EXAMPLES

The present invention will be described in further detail below with reference to examples, but the present invention is not limited to these examples.

Example 1

A cemented carbide powder with a composition containing 2.0% by mass of TiC, 1.2% by mass of TaC, 1.5% by mass of NbC, 8.0% by mass of Co, and the balance WC was pressed, sintered at 1400° C. for 1 hour in a vacuum atmosphere, and then subjected to smooth polishing and edge processing of an edge line with a SiC brush (horning of a width of 0.05 mm from the rake face side) to prepare a cemented carbide tip as a substrate having the same shape as a cutting tip CNMG120408N-UX (manufactured by Sumitomo Electric Hardmetal Corp.). The substrate had a beta-free layer of 17 μm formed on the surface thereof, two rake faces, and four flank faces, each rake face and each flank face being connected with an edge line (a hypothetical line because the edge processing had been performed) provided therebetween. The substrate had a total of eight edge lines. In addition, a point of intersection of two flank faces and one rake face was a corner (a hypothetical point of intersection because the edge processing had been performed). The substrate had a total of eight corners (however, in view of the shape, the tip is frequently used for cutting with the corners each having an apex angle of 80° as viewed from the top or the bottom, and, in this case, the number of the corners is considered as 4).

Then, the layers described below were formed as a coating layer in the order from a lower layer over the entire surface of the substrate by a known thermal CVD method. Namely, TiN of 0.4 μm, TiCN (formed by the MT-CVD method) of 4.6 μm, and α-alumina (α-$Al_2O_3$) of 2.2 μm were formed as the inner layer in that order from the surface side of the substrate, and TiN of 1.0 μm was formed as the outer layer on α-alumina of the uppermost layer of the inner layer so as to be in contact with the α-alumina (the coating layer is referred to as Coating layer No. 1).

Similarly, the entire surface of the substrate was coated with each of Coating layer Nos. 2 to 7 shown in Table I instead of Coating layer No. 1.

TABLE I

| | Coating layer | |
|---|---|---|
| No. | Inner layer | Outer layer |
| 1 | TiN(0.4 μm)/TiCN(MT-CVD, 4.6 μm)/α-$Al_2O_3$(2.2 μm) | TiN(0.5 μm) |
| 2 | TiC(1.0 μm)/TiCN(MT-CVD, 2.2 μm)/κ-$Al_2O_3$(2.6 μm) | TiCN(1.1 μm) |
| 3 | TiN(0.3 μm)/TiC(2.2 μm)/TiCN(MT-CVD, 4.5 μm)/κ-$Al_2O_3$(1.8 μm) | TiN(0.5 μm) |
| 4 | TiN(0.4 μm)/ZrCN(3.7 μm)/$ZrO_2$(0.7 μm)/α-$Al_2O_3$(1.8 μm) | ZrN(0.5 μm) |
| 5 | TiN(0.4 μm)/TiCN(MT-CVD, 5.3 μm)/TiBNO(0.7 μm)/α-$Al_2O_3$(4.9 μm) | TiN(0.7 μm) |
| 6 | TiN(0.3 μm)/TiCN(MT-CVD, 3.5 μm)/TiCN(HT-CVD, 1.1 μm)/TiBN(0.2 μm)/α-$Al_2O_3$ (3.7 μm) | TiN(0.6 μm) |
| 7 | TiN(0.4 μm)/TiCN(MT-CVD, 4.7 μm)/α-$Al_2O_3$(1.8 μm) | CrN(0.5 μm) |

Note)
In the inner layer of Coating layer No. 4, α-$Al_2O_3$ contains 5 atomic % of Zr elements (EPMA (Electron Probe Microanalysis) analytical result).

The layers shown in Table I were laminated on the surface of the substrate in the order from the left to form the inner layer. Each of the layers excluding a CrN layer of Coating layer No. 7 was formed by a known thermal CVD method (MT-CVD represents the MT-CVD method (deposition temperature 900° C.), and HT-CVD represents the HT-CVD method (deposition temperature 1000° C.). The CrN layer was formed by an ion plating method. TiN of the outer layer was gold color, ZrN was platinum color, TiCN was pink color, and CrN was silver color.

Each of the substrates with the coating layers formed thereon was processed by any one of 5 processing methods A to E below using a known blasting method (abrasive particles: alumina sand No. 120 (average particle diameter 100 μm), pressure: 0.3 MPa) and/or a brushing method (using a diamond brush).

(Processing Method A)

The coating layer was not processed by the blasting method or the brushing method.

(Processing Method B)

The coating layer was processed by the brushing method so that the outer layer had the average thicknesses shown in Tables II and III.

(Processing Method C)

The coating layer was processed by the blasting method so that the outer layer had the average thicknesses shown in Tables II and III.

(Processing Method D)

The coating layer was processed by the brushing method so that the outer layer had the average thicknesses shown in Tables II and III and then further processed by the blasting method.

(Processing Method E)

The coating layer was processed by the blasting method so that the outer layer had the average thicknesses shown in Tables II and III and then further processed by the brushing method.

In each of the outer layers shown in Table II and III, on a line passing through the corner (the corner subjected to the turning cutting test below) involved in cutting as shown in FIG. 12, dividing the angle formed by the two flank faces constituting the corner into two equal parts on the rake face, and extending from the rake face to the intersectional line of the two flank faces, the average thickness A μm in the segment region c of 0.5 mm to 1 mm from the corner to the flank face side, and the average thickness B μm in the segment region d of 0.5 mm to 1 mm from the corner to the rake face side were measured to determine the B/A value.

However, among the outer layers shown in Tables II and III, in the outer layer of each of the indexable inserts shown in Table IV, as shown in FIG. 14, the average thickness A μm in a region e extending with a width of 0.2 mm from a point at a distance of 0.4 mm from the exposed portion of the inner layer (from the boundary between the inner layer and the outer layer on the basis of the inner layer exposure distance shown in Table IV) to the center of the flank face and the average thickness B μm in a region f extending with a width of 0.2 mm from a point at a distance of 0.4 mm from the exposed portion of the inner layer to the center of the rake face were measured to determine the B/A value.

As described above, 32 types of indexable insert Nos. 1 to 32 shown in Tables II and III below were produced. In the tables, samples marked with "*" were examples of the present invention, and the others were comparative examples.

In each of the indexable inserts shown in Table IV, the inner layer was exposed in the region a extending along each edge line with the distance shown in Table IV from the edge line to the flank face side and the region b extending with the distance shown in Table IV from the edge line to the rake face side. In addition, the boundary between the inner layer and the outer layer was specified with an electron microscope and/or a metal microscope as described above, and the distances on the rake face side and the flank face side were measured on the line dividing the angle formed by the two flank faces constituting the corner into two equal parts on the rake face, and extending from the rake face to the intersectional line of the two flank faces.

Then, a turning test was conducted for each of indexable insert Nos. 1 to 32 under the conditions below to measure the surface roughness of a workpiece and an amount of flank wear of each indexable insert. After cutting for 40 minutes, welding of the cutting edge to the workpiece and the state of the processed surface of the workpiece were observed. The results are shown in Tables II and III. A lower value of surface roughness (Rz: JIS B0601: 2001) of the workpiece indicates high smoothness, and a smaller amount of flank wear indicates excellent wear resistance. Further, a larger amount of welding of the cutting edge to the workpiece indicates higher surface roughness of the work piece, and a processed surface closer to a mirror surface indicates that the work piece has an excellent processed surface.

(Conditions of Turning Test)
  Work piece: SCM415
  Cutting speed: 100 m/min
  Feed: 0.14 mm/rev.
  Depth of cut: 1.0 mm
  Lubricant: No
  Cutting time: 40 min

TABLE II

| | Cutting tip No. | Coating layer No. | Processing method | Outer layer A μm | B μm | B/A value | Amount of flank wear (mm) | Surface roughness of work piece Rz (μm) | Welding of work piece at cutting edge | State of processed surface of work piece |
|---|---|---|---|---|---|---|---|---|---|---|
| | 1 | 1 | A | 1.0 | 1.0 | 1.00 | 0.148 | 5.7 | Much | Clouded |
| | 2 | 2 | A | 1.5 | 1.5 | 1.00 | 0.135 | 5.4 | Much | Clouded |
| | 3 | 3 | A | 0.5 | 0.5 | 1.00 | 0.133 | 5.9 | Much | Clouded |
| | 4 | 4 | A | 0.5 | 0.5 | 1.00 | 0.118 | 5.7 | Much | Clouded |
| | 5 | 5 | A | 0.7 | 0.7 | 1.00 | 0.115 | 5.4 | Much | Clouded |
| | 6 | 6 | A | 0.6 | 0.6 | 1.00 | 0.114 | 6.0 | Much | Clouded |
| | 7 | 7 | A | 0.5 | 0.5 | 1.00 | 0.139 | 6.2 | Much | Clouded |
| | 8 | 1 | B | 0.9 | 0.9 | 1.00 | 0.132 | 5.3 | Much | Clouded |
| * | 9 | 1 | B | 0.9 | 0.8 | 0.89 | 0.101 | 3.8 | Very slight | Almost mirror surface |
| * | 10 | 1 | B | 0.9 | 0.5 | 0.56 | 0.089 | 3.2 | Very slight | Almost mirror surface |
| * | 11 | 1 | C | 0.9 | 0.2 | 0.22 | 0.072 | 2.9 | No | Mirror surface |
| * | 12 | 1 | C | 1.0 | 0.7 | 0.70 | 0.102 | 3.4 | Very slight | Almost mirror surface |
| * | 13 | 1 | C | 0.5 | 0.4 | 0.80 | 0.092 | 3.5 | Very slight | Almost mirror surface |
| | 14 | 1 | C | 0.4 | 0.6 | 1.50 | 0.133 | 5.1 | Slightly much | Almost mirror surface |
| * | 15 | 2 | B | 1.2 | 0.9 | 0.75 | 0.098 | 3.8 | Very slight | Almost mirror surface |
| * | 16 | 2 | C | 1.0 | 0.5 | 0.50 | 0.084 | 3.6 | Very slight | Almost mirror surface |

TABLE III

| Cutting tip No. | Coating layer No. | Processing method | Outer layer A μm | Outer layer B μm | B/A value | Amount of flank wear (mm) | Surface roughness of work piece Rz (μm) | Welding of work piece at cutting edge | State of processed surface of work piece |
|---|---|---|---|---|---|---|---|---|---|
| * 17 | 3 | B | 0.4 | 0.2 | 0.50 | 0.089 | 3.5 | Very slight | Almost mirror surface |
| * 18 | 3 | C | 0.4 | 0.2 | 0.50 | 0.092 | 3.6 | Very slight | Almost mirror surface |
| * 19 | 4 | B | 0.4 | 0.3 | 0.75 | 0.081 | 3.9 | Very slight | Almost mirror surface |
| * 20 | 4 | C | 0.4 | 0.3 | 0.75 | 0.080 | 3.8 | Very slight | Almost mirror surface |
| * 21 | 5 | B | 0.6 | 0.2 | 0.33 | 0.073 | 3.4 | No | Mirror surface |
| * 22 | 5 | C | 0.6 | 0.4 | 0.67 | 0.079 | 3.6 | Very slight | Almost mirror surface |
| * 23 | 6 | B | 0.6 | 0.4 | 0.67 | 0.072 | 3.5 | Very slight | Almost mirror surface |
| * 24 | 6 | C | 0.6 | 0.2 | 0.33 | 0.071 | 3.6 | Very slight | Almost mirror surface |
| * 25 | 7 | B | 0.5 | 0.4 | 0.80 | 0.089 | 3.7 | Very slight | Almost mirror surface |
| * 26 | 7 | C | 0.5 | 0.3 | 0.60 | 0.088 | 3.5 | Very slight | Almost mirror surface |
| * 27 | 2 | E | 0.4 | 0.2 | 0.50 | 0.058 | 2.9 | No | Mirror surface |
| * 28 | 2 | D | 0.4 | 0.2 | 0.50 | 0.049 | 2.6 | No | Mirror surface |
| * 29 | 2 | E | 0.4 | 0.2 | 0.50 | 0.079 | 3.1 | Very slight | Almost mirror surface |
| * 30 | 6 | E | 0.6 | 0.2 | 0.33 | 0.063 | 3.0 | No | Mirror surface |
| * 31 | 6 | D | 0.6 | 0.2 | 0.33 | 0.055 | 2.7 | No | Mirror surface |
| * 32 | 6 | E | 0.6 | 0.2 | 0.33 | 0.069 | 2.9 | Very slight | Almost mirror surface |

TABLE IV

| Indexable insert No. | Inner layer exposure distance | |
|---|---|---|
| | Region a (μm) | Region b (μm) |
| 11 | 320 | 1810 |
| 21 | 42 | 125 |
| 27 | 32 | 135 |
| 28 | 54 | 248 |
| 29 | 24 | 82 |
| 30 | 36 | 144 |
| 31 | 63 | 228 |
| 32 | 22 | 80 |

Tables II and III indicate that in the indexable inserts of the examples of the present invention in each of which the B/A value determined from the average thicknesses A μm and B μm of the outer layer is 0.9 or less, the amounts of flank wear are small, no welding of the cutting edge to the workpiece occurs, the state of the workpiece after cutting is close to a mirror surface, and the surface roughness of the workpiece is excellent, as compared with the indexable inserts of the comparative examples. As a reference, indexable insert Nos. 28 and 32 were processed by the blasting method to remove the outer layer from the entire surface and then subjected to the same cutting test as described above. As a result, the amount of flank wear and the state of the processed surface of the workpiece were the same as the results obtained by the indexable inserts of the examples of the present invention, but it was difficult to identify the corner used in the cutting test. Furthermore, as another reference, indexable insert No. 28 was produced by the same method except that TiC (2.6 μm) was formed instead of κ-$Al_2O_3$ (2.6 μm) of coating layer No. 2, and indexable insert No. 32 was produced by the same method except that α-$Al_2O_3$ (3.7 μm) of coating layer No. 6 was not formed (processing after the formation of the coating layer was the same in Nos. 28 and 32). As a result of the same cutting test as described above, in both Nos. 28 and 32, the amount of flank wear was 0.2 mm or more after a cutting time of 20 minutes, and thus wear resistance was poor.

Figure 15:
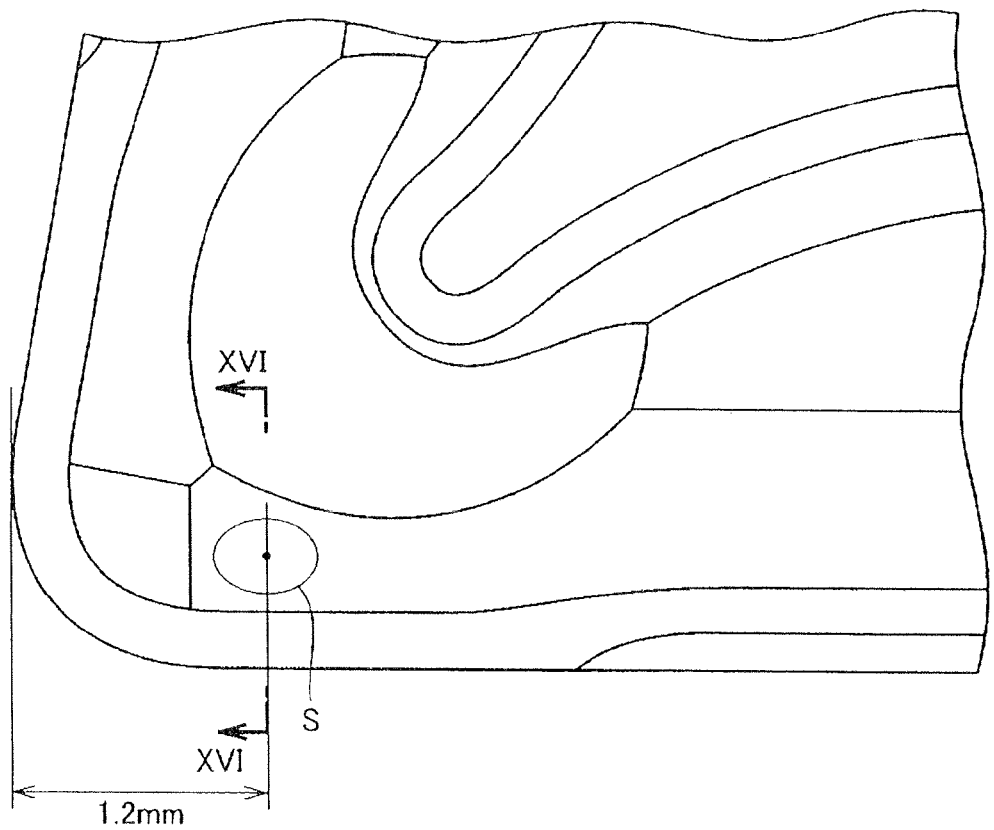
FIG. 15 is a schematic plan view showing one of the acute-angle corners of an indexable insert.
Figure 16:
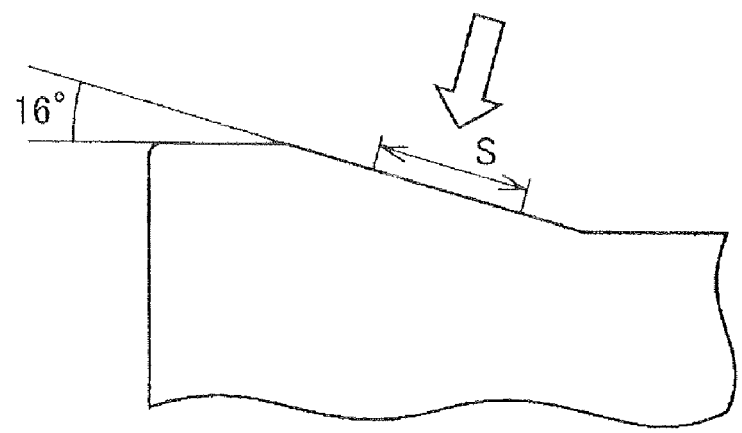
FIG. 16 is a schematic sectional view taken along line XVI-XVI in FIG. 15.

On the other hand, in indexable insert Nos. 5, 6, 22, 24, 31, and 32, the residual stress of the alumina ($\alpha$-$Al_2O_3$) layer as the uppermost layer of the inner layer was measured. The residual stress was measured in a region shown by spot S (spot size: diameter 0.5 mm) in FIG. 15 (the region corresponds to a portion of an inclined flat surface at an inclination angle of 16°, which constitutes a chip breaker as shown in FIG. 16 showing a XVI-XVI section of FIG. 15) near a corner involved in cutting on the rake face side of each of the indexable inserts in a vertical direction (to the inclined flat surface) shown by an arrow in FIG. 16 (specifically, using the $\sin^2 \phi$ method using an X-ray stress measuring apparatus). The measurement region is representative of portions of the rake face involved in cutting.

As the result of measurement, the residual stress of each indexable insert was as follows:
Indexable insert No. 5: 0.2 GPa
Indexable insert No. 6: 0.2 GPa
Indexable insert No. 22: −1.1 GPa
Indexable insert No. 24: −0.8 GPa
Indexable insert No. 31: −1.6 GPa
Indexable insert No. 32: −0.9 GPa Then, indexable insert Nos. 5, 6, 22, 24, 31, and 32 were subjected to an intermittent cutting test under the conditions below to measure a rate of edge defect (represented by a percentage of the number of defected corners relative to a total of 20 cutting edges measured). (Conditions of intermittent cutting test)
Work piece: SCM435 (round rod having four grooves)
Cutting speed: 100 m/min
Depth of cut: 2 mm
Feed: 0.4 mm/rev.
Lubricant: No
Cutting time: 1 min The results are shown below. A lower rate of defect indicates excellent toughness (defect resistance).
Indexable insert No. 5: 100%
Indexable insert No. 6: 100%
Indexable insert No. 22: 50%
Indexable insert No. 24: 40%
Indexable insert No. 31: 20%
Indexable insert No. 32: 30%

These results reveal that when the alumina layer as the uppermost layer of the inner layer has compressive stress in a portion involved in cutting, excellent toughness is exhibited.

The above-mentioned results reveal that the indexable inserts of the examples of the present invention have an excellent effect in comparison to the indexable insert of each comparative example, and are capable of decreasing as much as possible welding between the coating layer and the workpiece and thus effectively preventing deterioration in the surface state of the workpiece. Furthermore, in the indexable inserts of the examples of the present invention, the corner used in cutting can be easily identified. Although, in this example, indexable inserts provided with a chip breaker were produced, the present invention is effective for an indexable insert without a chip breaker described in the examples below.

Example 2

A cemented carbide powder with a composition containing 0.5% by mass of TiC, 0.4% by mass of TaC, 0.2% by mass of NbC, 5.0% by mass of Co, and the balance WC was pressed, sintered at 1450° C. for 1 hour in a vacuum atmosphere, and then subjected to smooth polishing and edge processing of edge lines with a SiC brush (horning of a width of 0.05 mm from the rake face side) to prepare a cemented carbide tip as a substrate having the same shape as a cutting tip CNMA120408 defined by JIS B4120 (revised in 1998). The substrate had neither chip breaker nor beta-free layer formed on the surface thereof, and had two rake faces, and four flank faces, each rake face and each flank face being connected with an edge line (a hypothetical line because the edge processing had been performed) provided therebetween. The substrate had a total of eight edge lines. In addition, a point of intersection of two flank faces and one rake face was a corner (a hypothetical point of intersection because the edge processing had been performed). The substrate had a total of eight corners (however, in view of the shape, the tip is frequently used for cutting with the corners each having an apex angle of 80° as viewed from the top or the bottom, and, in this case, the number of the corners is considered as 4).

Then, the same coating layers as in Example 1 were formed over the entire surface of the substrate as shown in Table V below (in Table V, coating layer No. is the same as in Example 1).

Each of the substrates with the coating layers formed thereon was processed by any one of the same 5 processing methods A to E as in Example 1. The thickness and B/A value of each of the outer layers shown in Table V were determined by the same method as in Example 1.

As described above, 20 types of indexable insert Nos. 33 to 52 shown in Table V were produced. In this table, samples marked with "*" were examples of the present invention, and the others were comparative examples. Like in the cutting tips shown in Table IV, in each of the indexable inserts shown in Table VI below, the inner layer was exposed.

Then, a tuning test was conducted for each of indexable insert Nos. 33 to 52 under the conditions below to measure an amount of flank wear of each indexable insert. After cutting for 10 minutes, welding of the cutting edge to the workpiece and the state of the processed surface of the workpiece were observed. The results are shown in Table V below.

(Conditions of Turning Test)
Work piece: FCD450
Cutting speed: 200 m/min
Feed: 0.35 mm/rev.
Depth of cut: 1.5 mm
Lubricant: present
Cutting time: 10 min

TABLE V

| Cutting tip No. | Coating layer No. | Processing method | Outer layer A μm | Outer layer B μm | B/A value | Amount of flank wear (mm) | Welding of work piece at cutting edge | State of processed surface of work piece |
|---|---|---|---|---|---|---|---|---|
| 33 | 1 | A | 1.0 | 1.0 | 1.00 | 0.213 | Much | Clouded |
| 34 | 2 | A | 1.5 | 1.5 | 1.00 | 0.228 | Much | Clouded |

TABLE V-continued

| | Coating | | Outer layer | | | Amount of flank wear (mm) | Welding of work piece at cutting edge | State of processed surface of work piece |
|---|---|---|---|---|---|---|---|---|
| Cutting tip No. | layer No. | Processing method | A μm | B μm | B/A value | | | |
| 35 | 4 | A | 0.5 | 0.5 | 1.00 | 0.221 | Much | Clouded |
| 36 | 5 | A | 0.7 | 0.7 | 1.00 | 0.195 | Much | Clouded |
| 37 | 6 | A | 0.6 | 0.6 | 1.00 | 0.187 | Much | Clouded |
| 38 | 1 | C | 0.9 | 0.9 | 1.00 | 0.200 | Much | Clouded |
| * 39 | 1 | B | 0.9 | 0.7 | 0.78 | 0.154 | Very slight | Glossy |
| * 40 | 1 | C | 0.8 | 0.4 | 0.50 | 0.148 | Very slight | Glossy |
| * 41 | 2 | B | 1.0 | 0.8 | 0.80 | 0.161 | Very slight | Glossy |
| * 42 | 2 | C | 1.1 | 0.6 | 0.66 | 0.158 | Very slight | Glossy |
| * 43 | 4 | B | 0.4 | 0.2 | 0.50 | 0.164 | Very slight | Glossy |
| * 44 | 4 | C | 0.4 | 0.1 | 0.25 | 0.163 | No | High gloss |
| * 45 | 5 | B | 0.4 | 0.2 | 0.50 | 0.143 | Very slight | Glossy |
| * 46 | 5 | C | 0.4 | 0.3 | 0.75 | 0.145 | Very slight | Glossy |
| * 47 | 5 | D | 0.4 | 0.2 | 0.50 | 0.132 | Very slight | Glossy |
| * 48 | 5 | E | 0.5 | 0.2 | 0.40 | 0.130 | No | High gloss |
| * 49 | 6 | B | 0.5 | 0.3 | 0.60 | 0.140 | Very slight | Glossy |
| * 50 | 6 | C | 0.5 | 0.2 | 0.40 | 0.137 | Very slight | Glossy |
| * 51 | 6 | D | 0.5 | 0.2 | 0.40 | 0.132 | No | High gloss |
| * 52 | 6 | E | 0.5 | 0.3 | 0.60 | 0.138 | Very slight | Glossy |

TABLE VI

| | Inner layer exposure distance | |
|---|---|---|
| Indexable insert No. | Region a (μm) | Region b (μm) |
| 44 | 34 | 118 |
| 48 | 52 | 254 |
| 51 | 84 | 448 |

Table V indicates that in the indexable inserts of the examples of the present invention in each of which the B/A value determined from the average thicknesses A μm and B μm of the outer layer is 0.9 or less, the amounts of flank wear are satisfactory, no welding of the cutting edge to the workpiece occurs, and the state of the workpiece after cutting has excellent gloss (in the table, "High gloss" represents a glass state superior to that represented by "Glossy"), as compared with the indexable inserts of the comparative examples. As a reference, indexable insert Nos. 48 and 51 were processed by the blasting method to remove the outer layer from the entire surface and then subjected to the same cutting test as described above. As a result, the amount of flank wear and the state of the processed surface of the workpiece were the same as the results obtained by the indexable inserts of the examples of the present invention, but it was difficult to identify the corner used in the cutting test. Furthermore, as another reference, indexable insert Nos. 48 and 51 were produced by the same method except that (α-Al$_2$O$_3$ (4.9 μm) of coating layer No. 5 and α-Al$_2$O$_3$ (3.7 μm) of coating layer No. 6, respectively, were not formed (processing after the formation of the coating layer was the same in Nos. 48 and 51). As a result of the same cutting test as described above, in both Nos. 48 and 51, the amount of flank wear was 0.3 mm or more after a cutting time of 5 minutes, and thus wear resistance was poor.

Figure 17:
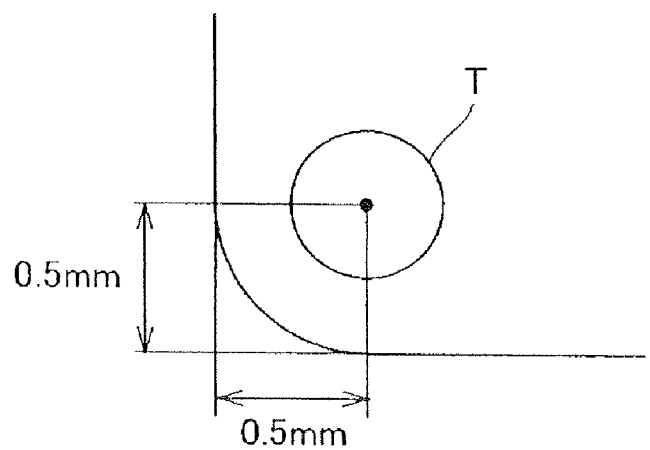
FIG. 17 is a schematic plan view showing one of the corners of an indexable insert.

On the other hand, in indexable insert Nos. 33, 34, 40, and 42, the residual stress of the alumina (α-Al$_2$O$_3$ or κ-Al$_2$O$_3$) layer as the uppermost layer of the inner layer was measured. The residual stress was measured in a region shown by spot T (spot size: diameter 0.5 mm) in FIG. 17 near a corner involved in cutting on the rake face side of each of the indexable insert (specifically, using the sin$^2$ φ method using an X-ray stress measuring apparatus). The measurement region is representative of portions of the rake face involved in cutting.

As the result of measurement, the residual stress of each indexable insert was as follows:
  Indexable insert No. 33: 0.2 GPa
  Indexable insert No. 34: 0.2 GPa
  Indexable insert No. 40: −1.3 GPa
  Indexable insert No. 42: −2.0 GPa Then, indexable insert Nos. 33, 34, 40, and 42 were subjected to an intermittent cutting test under the conditions below to measure a rate of edge defect (represented by a percentage of the number of defected corners relative to a total of 20 cutting edges measured). (Conditions of intermittent cutting test)
  Work piece: S50C square bar
  Cutting speed: 120 m/min
  Depth of cut: 2 mm
  Feed: 0.4 mm/rev.
  Lubricant: No
  Cutting time: 30 seconds The results are shown below. A lower rate of defect indicates excellent toughness (defect resistance).
  Indexable insert No. 33: 100%

Indexable insert No. 34: 100%
Indexable insert No. 40: 45%
Indexable insert No. 42: 20%

These results reveal that when the alumina layer provided as the uppermost layer of the inner layer has compressive stress in a portion involved in cutting, excellent toughness is exhibited.

The above-mentioned results reveal that the indexable inserts of the examples of the present invention have an excellent effect in comparison to the indexable insert of each comparative example, and are capable of decreasing as much as possible welding between the coating layer and the workpiece and thus effectively preventing deterioration in the surface state of the workpiece. Furthermore, in the indexable inserts of the examples of the present invention, the corner used in cutting can be easily identified.

Example 3

A cemented carbide powder with a composition containing 1.5% by mass of TaC, 10.0% by mass of Co, and the balance WC was pressed, sintered at 1400° C. for 1 hour in a vacuum atmosphere, and then subjected to smooth polishing and edge processing of edge lines with a SiC brush (horning of a width of 0.05 mm from the rake face side) to prepare a cemented carbide tip as a substrate having the same shape as a cutting tip SEMT13T3AGSN-G (manufactured by Sumitomo Electric Hardmetal Corp.). The substrate had no beta-free layer formed on the surface thereof, one rake face, and four flank faces, the rake face and each flank face being connected with the edge line (a hypothetical line because the edge processing had been performed) provided therebetween. The substrate had a total of four edge lines. In addition, a point of intersection of two flank faces and one rake face was a corner (a hypothetical point of intersection because the edge processing had been performed). The substrate had a total of four corners.

Then, the layers described below were formed as a coating layer in the order from a lower layer over the entire surface of the substrate by a known thermal CVD method. Namely, TiN of 0.4 μm, TiCN (formed by the MT-CVD method) of 2.0 μm, and α-alumina (α-$Al_2O_3$) of 2.1 μm were formed as the inner layer in that order from the surface side of the substrate, and TiN of 0.6 μm was formed as the outer layer on α-alumina of the uppermost layer of the inner layer so as to be in contact with the α-alumina (the coating layer is referred to as Coating layer No. 8).

Similarly, the entire surface of the substrate was coated with each of Coating layer Nos. 9 to 13 shown in Table VII instead of Coating layer No. 8.

TABLE VII

| | Coating layer | |
|---|---|---|
| No. | Inner layer | Outer layer |
| 8 | TiN(0.4 μm)/TiCN(MT-CVD, 2.0 μm)/α-$Al_2O_3$(2.1 μm) | TiN(0.6 μm) |
| 9 | TiC(0.4 μm)/TiCN(MT-CVD, 3.2 μm)/TiBN(0.5 μm)/κ-$Al_2O_3$(1.2 μm) | TiN(0.7 μm) |
| 10 | TiN(0.4 μm)/TiCN(MT-CVD, 4.6 μm)/κ-$Al_2O_3$(1.0 μm) | TiN(0.7 μm) |
| 11 | TiAlN(2.2 μm)/α-$Al_2O_3$(1.8 μm) | TiN(1.3 μm) |
| 12 | CrAlN(3.0 μm)/κ-$Al_2O_3$(1.2 μm) | TiCN(0.6 μm) |
| 13 | TiN(0.3 μm)/α-$Al_2O_3$(3.2 μm) | TiCN(0.6 μm) |

The layers shown in Table VII were laminated on the surface of the substrate in the order from the left to form the inner layer. Like in Coating layer No. 7, all layers in Coating layer Nos. 8 to 10 were formed by a known thermal CVD method. The layers in Coating layer Nos. 11 to 13 were formed by a known PVD method.

Each of the substrates with the coating layers formed thereon was processed by any one of the same 5 processing methods A to E as in Example 1.

As described above, 25 types of indexable insert Nos. 53 to 77 shown in Tables VIII and IX below were produced. In the tables, samples marked with "*" were examples of the present invention, and the others were comparative examples. In Tables VIII and IX, the thicknesses and the B/A values of the outer layers were determined by the same method as in Example 1. In each of the indexable inserts shown in Table X, the inner layer was exposed in the same manner as shown in Table IV of Example 1.

Then, a milling test was conducted for each of indexable insert Nos. 53 to 77 under the conditions below to measure the surface roughness of a workpiece and an amount of flank wear of each indexable insert. Also, welding of the workpiece to the cutting edge and the state of the processed surface of the workpiece after milling were observed. The results are shown in Tables VIII and IX.

(Conditions of Milling Test)
Work piece: SCM435
Cutting speed: 235 m/min
Feed: 0.25 mm/teeth
Depth of cut: 2.0 mm
Lubricant: used
Cutting length: 10 m
Cutter: WGC4100R (manufactured by Sumitomo Electric Hardmetal Corp.)
The cutter was provided with one indexable insert.

TABLE VIII

| Cutting tip No. | Coating layer No. | Processing method | Outer layer A μm | B μm | B/A value | Amount of flank wear (mm) | Surface roughness of work piece Rz (μm) | Welding of work piece at cutting edge | State of processed surface of work piece |
|---|---|---|---|---|---|---|---|---|---|
| 53 | 8 | A | 0.6 | 0.6 | 1.00 | 0.198 | 7.2 | Much | Clouded |
| 54 | 9 | A | 0.7 | 0.7 | 1.00 | 0.212 | 6.8 | Much | Clouded |
| 55 | 10 | A | 0.7 | 0.7 | 1.00 | 0.189 | 6.5 | Much | Clouded |
| 56 | 11 | A | 1.3 | 1.3 | 1.00 | 0.224 | 6.4 | Much | Clouded |
| 57 | 12 | A | 0.6 | 0.6 | 1.00 | 0.219 | 6.6 | Much | Clouded |
| 58 | 13 | A | 0.6 | 0.6 | 1.00 | 0.248 | 6.8 | Much | Clouded |

TABLE VIII-continued

| Cutting tip No. | Coating layer No. | Processing method | Outer layer A μm | B μm | B/A value | Amount of flank wear (mm) | Surface roughness of work piece Rz (μm) | Welding of work piece at cutting edge | State of processed surface of work piece |
|---|---|---|---|---|---|---|---|---|---|
| *  59 | 8 | C | 0.5 | 0.3 | 0.60 | 0.132 | 4.2 | Very slight | Almost mirror surface |
| *  60 | 8 | B | 0.5 | 0.4 | 0.80 | 0.129 | 4.3 | Very slight | Almost mirror surface |
| 61 | 9 | C | 0.2 | 0.6 | 3.00 | 0.189 | 6.7 | Slightly much | Almost mirror surface |
| *  62 | 9 | C | 0.5 | 0.1 | 0.20 | 0.135 | 4.0 | Very slight | Almost mirror surface |
| *  63 | 10 | C | 0.9 | 0.5 | 0.56 | 0.144 | 4.1 | Very slight | Almost mirror surface |
| *  64 | 10 | B | 0.8 | 0.2 | 0.25 | 0.140 | 3.8 | No | Mirror surface |
| 65 | 11 | C | 1.2 | 1.1 | 0.92 | 0.161 | 6.4 | Slightly much | Almost mirror surface |

TABLE IX

| Cutting tip No. | Coating layer No. | Processing method | Outer layer A μm | B μm | B/A value | Amount of flank wear (mm) | Surface roughness of work piece Rz (μm) | Welding of work piece at cutting edge | State of processed surface of work piece |
|---|---|---|---|---|---|---|---|---|---|
| *  66 | 11 | C | 1.0 | 0.6 | 0.60 | 0.148 | 4.0 | Very slight | Almost mirror surface |
| *  67 | 11 | B | 1.0 | 0.4 | 0.40 | 0.147 | 3.9 | Very slight | Almost mirror surface |
| *  68 | 12 | C | 0.5 | 0.3 | 0.60 | 0.146 | 3.8 | Very slight | Almost mirror surface |
| *  69 | 12 | B | 0.4 | 0.2 | 0.50 | 0.137 | 3.3 | No | Mirror surface |
| *  70 | 13 | C | 0.5 | 0.4 | 0.80 | 0.154 | 3.6 | Very slight | Almost mirror surface |
| *  71 | 13 | B | 0.4 | 0.3 | 0.75 | 0.156 | 3.6 | Very slight | Almost mirror surface |
| *  72 | 9 | E | 0.5 | 0.3 | 0.80 | 0.119 | 3.2 | No | Mirror surface |
| *  73 | 9 | D | 0.5 | 0.4 | 0.80 | 0.118 | 3.1 | No | Mirror surface |
| *  74 | 9 | E | 0.5 | 0.2 | 0.40 | 0.129 | 3.9 | Very slight | Almost mirror surface |
| *  75 | 11 | E | 1.0 | 0.6 | 0.60 | 0.125 | 3.2 | No | Mirror surface |
| *  76 | 11 | D | 1.0 | 0.8 | 0.80 | 0.124 | 3.1 | No | Mirror surface |
| *  77 | 11 | E | 0.9 | 0.2 | 0.22 | 0.139 | 3.8 | Very slight | Almost mirror surface |

TABLE X

| Indexable insert No. | Inner layer exposure distance | |
|---|---|---|
| | Region a (μm) | Region b (μm) |
| 64 | 38 | 133 |
| 69 | 64 | 454 |
| 72 | 68 | 225 |
| 73 | 75 | 188 |
| 74 | 21 | 68 |
| 75 | 84 | 304 |
| 76 | 24 | 48 |

Tables VIII and IX indicate that in the indexable inserts of the examples of the present invention in each of which the B/A value determined from the average thicknesses A μm and B μm of the outer layer is 0.9 or less, the amounts of flank wear are satisfactory, no welding of the cutting edge to the workpiece occurs, the state of the workpiece after cutting is close to a mirror surface, and the surface roughness of the workpiece is excellent, as compared with the indexable inserts of the comparative examples. As a reference, indexable insert Nos. 53 and 54 were processed by the blasting method to remove the outer layer from the entire surface and then subjected to the same cutting test as described above. As a result, the amount of flank wear and the state of the processed surface of the workpiece were the same as the results obtained by the indexable inserts of the examples of the present invention, but it was difficult to identify the corner used in the cutting test. Furthermore, as another reference, indexable insert Nos. 53 and 54 were produced by the same method except that α-$Al_2O_3$ (2.1 μm) of coating layer No. 8 and κ-$Al_2O_3$ (1.2 μm) of coating layer No. 9, respectively, were not formed (processing after the formation of the coating layer was the same in Nos. 53 and 54). As a result of the same cutting test as described above, in both Nos. 53 and 54, the amount of flank wear was 0.4 mm or more with a cutting length of 5 m, and thus wear resistance was poor.

Figure 18:
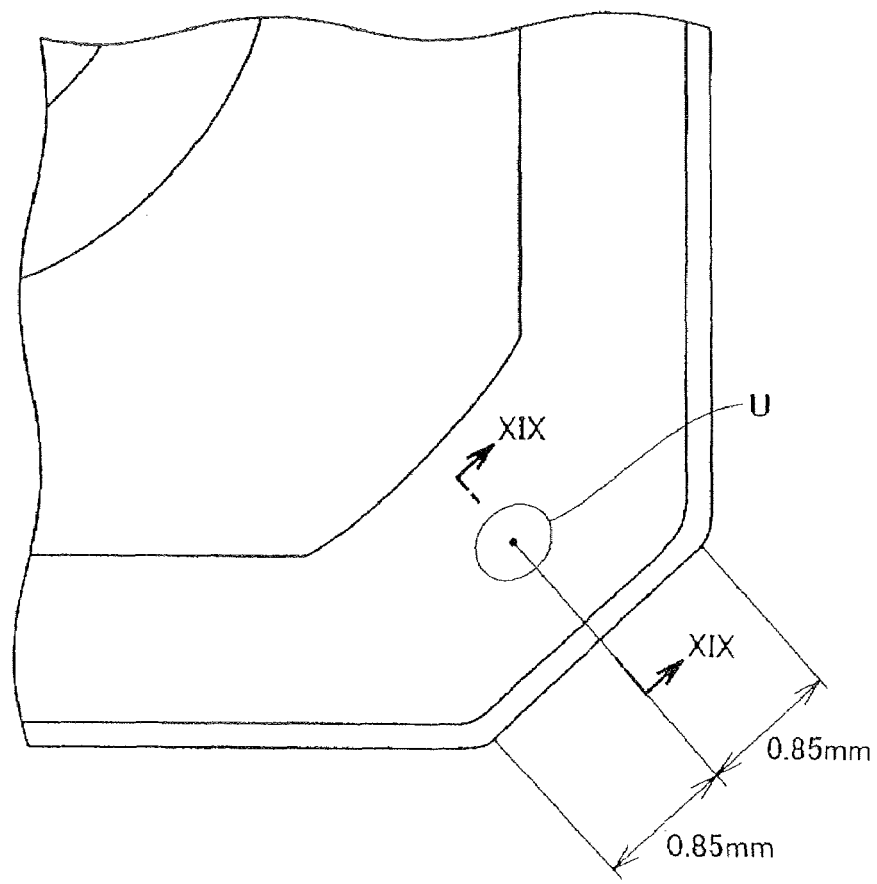
FIG. 18 is a schematic plan view showing one of the different corners of an indexable insert.
Figure 19:
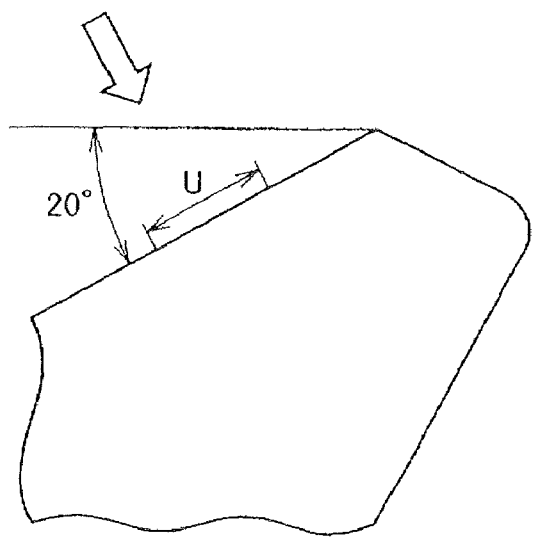
FIG. 19 is a schematic sectional view taken along line XIX-XIX in FIG. 18.

On the other hand, in each of indexable insert Nos. 53, 54, 59, 62, 72, 73, and 74, the residual stress of the alumina (α-$Al_2O_3$ or κ-$Al_2O_3$) layer as the uppermost layer of the inner layer was measured. The residual stress was measured in a region shown by spot U (spot size: diameter 0.5 mm) in FIG. 18 (the region corresponds to a portion of an inclined flat surface at an inclination angle of 20°, which constitutes a chip breaker as shown in FIG. 19 showing a XIX-XIX section of FIG. 18) near a corner involved in cutting on the rake face side of each of the indexable insert in a vertical direction (to the inclined flat surface) shown by an arrow in FIG. 19 (specifically, using the $\sin^2 \phi$ method using an X-ray stress measuring apparatus). The measurement region is representative of portions of the rake face involved in cutting.

As the result of measurement, the residual stress of each indexable insert was as follows:
  Indexable insert No. 53: 0.2 GPa
  Indexable insert No. 54: 0.1 GPa
  Indexable insert No. 59: −0.5 GPa
  Indexable insert No. 62: −0.9 GPa
  Indexable insert No. 72: −1.4 GPa
  Indexable insert No. 73: −0.7 GPa
  Indexable insert No. 74: −0.8 GPa Then, indexable insert Nos. 53, 54, 59, 62, 72, 73, and 74 were subjected to an intermittent cutting test under the conditions below to measure a rate of edge defect (represented by a percentage of the number of defected corners relative to a total of 20 cutting edges measured).

(Conditions of Intermittent Cutting Test)
  Work piece: SCM435 (laminate of three blocks)
  Cutting speed: 174 m/min
  Depth of cut: 2 mm
  Feed: 0.4 mm/edge
  Lubricant: No
  Cutting length: 1 m The results are shown below. A lower rate of defect indicates excellent toughness (defect resistance).
  Indexable insert No. 53: 100%
  Indexable insert No. 54: 100%
  Indexable insert No. 59: 45%
  Indexable insert No. 62: 50%
  Indexable insert No. 72: 20%
  Indexable insert No. 73: 30%
  Indexable insert No. 74: 35%

These results reveal that when the alumina layer provided as the uppermost layer of the inner layer has compressive stress in a portion involved in cutting, excellent toughness is exhibited.

The above-mentioned results reveal that the indexable inserts of the examples of the present invention have an excellent effect in comparison to the indexable insert of each comparative example, and are capable of decreasing as much as possible welding between the coating layer and the workpiece and thus effectively preventing deterioration in the surface state of the workpiece. Furthermore, in the indexable inserts of the examples of the present invention, the corner used in cutting can be easily identified. Although, in this example, an indexable insert provided with a chip breaker was produced, the present invention is effective for an indexable insert without a chip breaker described in the example below.

Example 4

Figure 13:
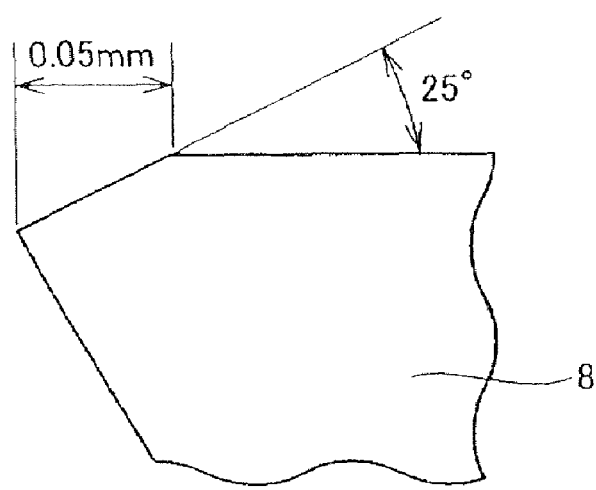
FIG. 13 is a schematic sectional view of an edge-processed portion of a substrate.

A cemented carbide powder with a composition containing 0.3% by mass of TaC, 0.3% by mass of $Cr_3C_2$, 7.0% by mass of Co, and the balance WC was pressed, sintered at 1450° C. for 1 hour in a vacuum atmosphere, and then subjected to smooth polishing and edge processing of edge lines with a SiC brush (horning of a width of 0.05 mm at 25° from the rake face side as shown in FIG. 13) to prepare a cemented carbide tip as a substrate having the same shape as a cutting tip SPGN120408 defined by JIS B4120 (revised in 1998). The substrate had neither chip breaker nor beta-free layer formed on the surface thereof, and had one rake face, and four flank faces, the rake face and each flank face being connected with the edge line (a hypothetical line because the edge processing had been performed) provided therebetween. The substrate had a total of four edge lines. In addition, a point of intersection of two flank faces and one rake face was a corner (a hypothetical point of intersection because the edge processing had been performed). The substrate had a total of four corners.

Then, the same coating layers as in Example 3 were formed over the entire surface of the substrate as shown in Table XI below (in Table XI, Coating layer No. is the same as in Example 3).

Each of the substrates with the coating layers formed thereon was processed by any one of the same 5 processing methods A to E as in Example 1. The thickness and B/A value of each of the outer layers shown in Table XI were determined by the same method as in Example 1.

As described above, 22 types of indexable insert Nos. 78 to 99 shown in Table XI were produced. In this table, samples marked with "*" were examples of the present invention, and the others were comparative examples. Like in the cutting tips shown in Table IV of Example 1, in each of the indexable inserts shown in Table XII below, the inner layer was exposed.

Then, a milling test was conducted for each of indexable insert Nos. 78 to 99 under the conditions below to measure an amount of flank wear of each indexable insert. After milling, welding of the cutting edge to the workpiece and the state of the processed surface of the workpiece were observed. The results are shown in Table XI below.

(Conditions of Milling Test)
Work piece: FC250
Cutting speed: 200 m/min
Feed: 0.30 mm/teeth
Depth of cut: 2.0 mm
Lubricant: no
Cutting length: 10 m
Cutter: DPG4100R (manufactured by Sumitomo Electric Hardmetal Corp.)
The cutter was provided with one indexable insert.

TABLE XII

| Indexable insert No. | Inner layer exposure distance | |
|---|---|---|
| | Region a (μm) | Region b (μm) |
| 86 | 390 | 1950 |
| 89 | 62 | 211 |
| 93 | 77 | 240 |
| 96 | 88 | 159 |

Table XI indicates that in the indexable inserts of the examples of the present invention in each of which the B/A value determined from the average thicknesses A μm and B μm of the outer layer is 0.9 or less, the amounts of flank wear are satisfactory, no welding of the cutting edge to the workpiece occurs, and the state of the workpiece after cutting has excellent gloss, as compared with the indexable inserts of the comparative examples. As a reference, indexable insert Nos. 89 and 93 were processed by the blasting method to remove the outer layer from the entire surface and then subjected to the same cutting test as described above. As a result, the amount of flank wear and the state of the processed surface of the workpiece were the same as the results obtained by the indexable inserts of the examples of the present invention, but it was difficult to identify the corner used in the cutting test. Furthermore, as another reference, indexable insert Nos. 89

TABLE XI

| | Cutting tip No. | Coating layer No. | Processing method | Outer layer A μm | Outer layer B μm | B/A value | Amount of flank wear (mm) | Welding of work piece at cutting edge | State of processed surface of work piece |
|---|---|---|---|---|---|---|---|---|---|
| | 78 | 8 | A | 0.6 | 0.6 | 1.00 | 0.246 | Much | Clouded |
| | 79 | 9 | A | 0.7 | 0.7 | 1.00 | 0.240 | Much | Clouded |
| | 80 | 10 | A | 0.7 | 0.7 | 1.00 | 0.225 | Much | Clouded |
| | 81 | 11 | A | 1.3 | 1.3 | 1.00 | 0.253 | Much | Clouded |
| | 82 | 12 | A | 0.6 | 0.6 | 1.00 | 0.238 | Much | Clouded |
| | 83 | 13 | A | 0.6 | 0.6 | 1.00 | 0.264 | Much | Clouded |
| * | 84 | 8 | B | 0.5 | 0.2 | 0.40 | 0.165 | Very slight | Glossy |
| * | 85 | 8 | C | 0.5 | 0.3 | 0.60 | 0.161 | Very slight | Glossy |
| * | 86 | 9 | B | 0.5 | 0.2 | 0.40 | 0.141 | No | High gloss |
| * | 87 | 9 | C | 0.4 | 0.2 | 0.50 | 0.165 | Very slight | Glossy |
| * | 88 | 9 | B | 0.4 | 0.3 | 0.75 | 0.168 | Very slight | Glossy |
| * | 89 | 10 | C | 0.5 | 0.2 | 0.40 | 0.135 | No | High gloss |
| * | 90 | 10 | B | 0.6 | 0.3 | 0.50 | 0.158 | Very slight | Glossy |
| * | 91 | 10 | C | 0.5 | 0.2 | 0.40 | 0.187 | Very slight | Glossy |
| * | 92 | 10 | D | 0.4 | 0.2 | 0.50 | 0.159 | Very slight | Glossy |
| * | 93 | 11 | E | 1.0 | 0.6 | 0.60 | 0.160 | No | High gloss |
| * | 94 | 11 | B | 0.9 | 0.3 | 0.33 | 0.172 | Very slight | Glossy |
| * | 95 | 11 | C | 0.8 | 0.4 | 0.50 | 0.177 | Very slight | Glossy |
| * | 96 | 12 | B | 0.5 | 0.2 | 0.40 | 0.162 | No | High gloss |
| * | 97 | 12 | C | 0.5 | 0.3 | 0.60 | 0.179 | Very slight | Glossy |
| * | 98 | 13 | B | 0.4 | 0.2 | 0.50 | 0.188 | Very slight | Glossy |
| * | 99 | 13 | C | 0.5 | 0.3 | 0.60 | 0.186 | Very slight | Glossy | and 93 were produced by the same method except that κ-Al$_2$O$_3$ (1.0 μm) of coating layer No. 10 and α-Al$_2$O$_3$ (1.8 μm) of coating layer No. 11, respectively, were not formed (processing after the formation of the coating layer was the same in Nos. 89 and 93). As a result of the same cutting test as described above, in both Nos. 89 and 93, the amount of flank wear was 0.3 mm or more with a cutting length of 3 m, and thus wear resistance was poor.

On the other hand, in each of indexable insert Nos. 78, 80, 85, and 87, the residual stress of the alumina (α-Al$_2$O$_3$ or κ-Al$_2$O$_3$) layer as the uppermost layer of the inner layer was measured. The residual stress was measured in a region shown by spot T (spot size: diameter 0.5 mm) in FIG. 17 near a corner involved in cutting on the rake face side of each of the indexable insert (specifically, using the $\sin^2 \phi$ method using an X-ray stress measuring apparatus). The measurement region is representative of portions of the rake face involved in cutting.

As the result of measurement, the residual stress of each indexable insert was as follows:

Indexable insert No. 78: 0.2 GPa
Indexable insert No. 80: 0.2 GPa
Indexable insert No. 85: −1.6 GPa
Indexable insert No. 87: −2.4 GPa Then, indexable insert Nos. 78, 80, 85, and 87 were subjected to an intermittent cutting test under the conditions below to measure a rate of edge defect (represented by a percentage of the number of defected corners relative to a total of 20 cutting edges measured). (Conditions of intermittent cutting test)

Work piece: FC250 (laminate of three blocks)
Cutting speed: 180 m/min
Depth of cut: 2 mm
Feed: 0.45 mm/teeth
Lubricant: No
Cutting length: 1 m The results are shown below. A lower rate of defect indicates excellent toughness (defect resistance).

Indexable insert No. 78: 100%
Indexable insert No. 80: 100%
Indexable insert No. 85: 25%
Indexable insert No. 87: 15%

These results reveal that when the alumina layer provided as the uppermost layer of the inner layer has compressive stress in a portion involved in cutting, excellent toughness is exhibited.

The above-mentioned results reveal that the indexable inserts of the examples of the present invention have an excellent effect in comparison to the indexable insert of each comparative example, and are capable of decreasing as much as possible welding between the coating layer and the workpiece and thus effectively preventing deterioration in the surface state of the workpiece. Furthermore, in the indexable inserts of the examples of the present invention, the corner used in cutting can be easily identified.

Although the embodiment and examples of the present invention are described above, it is originally estimated that the constitutions of the embodiments and examples are appropriately combined.

It should be thought that the above-described embodiments and examples are only illustrative and not limitative in all respects. It is intended that the scope of the present invention is described in the claims, not in the above description, and includes meanings equivalent to those in the claims and any change within the scope of the present invention.

The invention claimed is:

1. An indexable insert (1) comprising a substrate (8) and a coating layer (11) formed on the substrate (8),
   wherein the substrate (8) has at least one flank face (3) and at least one rake face (2),
   the flank face (3) and the rake face (2) are connected with an edge line (4) provided therebetween,
   the coating layer (11) includes an inner layer (12) including at least one layer and an outer layer (13) formed on the inner layer (12),
   the inner layer (12) includes an alumina layer or an alumna-containing layer serving as an outermost layer in contact with the outer layer (13),
   the outer layer (13) is composed of at least one metal selected from the group consisting of the periodic table group IVa elements, Va elements, and VIa elements, Al, and Si or a compound of at least one of the metals and at least one element selected from the group consisting of carbon, nitrogen, oxygen, and boron, and
   the outer layer (13), in a portion involved in cutting, satisfies B/A≦0.9 wherein A μm is the average thickness on the flank face (3) side, and B μm is the average thickness on the rake face (2) side.

2. The indexable insert (1) according to claim 1, wherein the substrate (8) includes any one of a cemented carbide, cermet, high-speed steel, ceramics, a cubic boron nitride sintered compact, a diamond sintered compact, and a silicon nitride sintered compact.

3. The indexable insert (1) according to claim 1, wherein the indexable insert (1) is used for any one of drilling, end milling, milling, turning, metal sawing, gear cutting, reaming, tapping, and crankshaft pin milling.

4. An indexable insert (1) comprising a substrate (8) and a coating layer (11) formed on the substrate (8),
   wherein the substrate (8) has at least two flank faces (3), at least one rake face (2), and at least one corner (9),
   each flank face (3) and the rake face (2) are connected with an edge line (4) provided therebetween,
   the corner (9) is the point of intersection of the two flank faces (3) and the one rake face (2),
   the coating layer (11) includes an inner layer (12) including at least one layer and an outer layer (13) formed on the inner layer (12),
   the inner layer (12) includes an alumina layer or an alumna-containing layer serving as an outermost layer in contact with the outer layer (13),
   the outer layer (13) is composed of at least one metal selected from the group consisting of the periodic table group IVa elements, Va elements, and VIa elements, Al, and Si or a compound of at least one of the metals and at least one element selected from the group consisting of carbon, nitrogen, oxygen, and boron, and
   the outer layer (13) satisfies B/A≦0.9 wherein A μm is the average thickness in a segment region of 0.5 mm to 1 mm from the corner (9) to the flank face (3) side, and B μm is the average thickness in a segment region of 0.5 mm to 1 mm from the corner (9) to the rake face (2) side on a line passing through the corner (9) involved in cutting, dividing the angle formed by the two flank faces (3) constituting the corner (9) into two equal parts on the rake face (2), and extending from the rake face (2) to the intersectional line of the two flank faces (3).

5. The indexable insert (1) according to claim 4, wherein the substrate (8) includes any one of a cemented carbide, cermet, high-speed steel, ceramics, a cubic boron nitride sintered compact, a diamond sintered compact, and a silicon nitride sintered compact.

6. The indexable insert (1) according to claim 4, wherein the indexable insert (1) is used for any one of drilling, end milling, milling, turning, metal sawing, gear cutting, reaming, tapping, and crankshaft pin milling.

7. An indexable insert (1) comprising a substrate (8) and a coating layer (11) formed on the substrate (8),
   wherein the substrate (8) has at least one flank face (3) and at least one rake face (2),
   the flank face (3) and the rake face (2) are connected with an edge line (4) provided therebetween,
   the coating layer (11) includes an inner layer (12) including at least one layer and an outer layer (13) formed on the inner layer (12),
   the inner layer (12) includes an alumina layer or an alumna-containing layer serving as an outermost layer in contact with the outer layer (13),
   the outer layer (13) is composed of at least one metal selected from the group consisting of the periodic table group IVa elements, Va elements, and VIa elements, Al, and Si or a compound of at least one of the metals and at least one element selected from the group consisting of carbon, nitrogen, oxygen, and boron,
   the inner layer (12) is exposed in a region extending with a distance of less than 0.4 mm from the edge line (4) to the flank face (3) side and a region extending with a distance of less than 2 mm from the edge line (4) to the rake face (2) side, the surface of the exposed portion of the inner layer (12) being composed of an alumina layer or an alumina-containing layer,
   the outer layer (13) satisfies B/A≦0.9 wherein A μm is the average thickness in a region extending with a width of 0.2 mm from a point at a distance of 0.4 mm from the exposed portion of the inner layer (12) to the center of the flank face (3), and B μm is the average thickness in a region extending with a width of 0.2 mm from a point at a distance of 0.4 mm from the exposed portion of the inner layer (12) to the center of the rake face (2).

8. The indexable insert (1) according to claim 7, wherein the substrate (8) includes any one of a cemented carbide, cermet, high-speed steel, ceramics, a cubic boron nitride sintered compact, a diamond sintered compact, and a silicon nitride sintered compact.

9. The indexable insert (1) according to claim 7, wherein the indexable insert (1) is used for any one f drilling, end milling, milling, turning, metal sawing, gear cutting, reaming, tapping, and crankshaft pin milling.

* * * * *